(12) United States Patent  
Kojima

(10) Patent No.: US 8,767,238 B2  
(45) Date of Patent: Jul. 1, 2014

(54) IMAGE FORMING APPARATUS AND IMAGE FORMING SYSTEM WITH POWER-SAVING MODE

(75) Inventor: Naosato Kojima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 495 days.

(21) Appl. No.: 13/149,742

(22) Filed: May 31, 2011

(65) Prior Publication Data

US 2011/0292446 A1    Dec. 1, 2011

(30) Foreign Application Priority Data

Jun. 1, 2010    (JP) ................................. 2010-125679

(51) Int. Cl.
*G06F 3/12*        (2006.01)

(52) U.S. Cl.
USPC ......... 358/1.15; 358/1.14; 358/401; 358/436; 358/437; 709/217; 709/218; 709/219; 700/22; 700/295; 700/297; 713/300; 713/320; 713/321; 713/330

(58) Field of Classification Search
None
See application file for complete search history.

(56) References Cited

U.S. PATENT DOCUMENTS

| | | | | |
|---|---|---|---|---|
| 7,590,539 | B1 * | 9/2009 | Kirkpatrick | .................... 704/260 |
| 7,898,677 | B2 * | 3/2011 | Okamoto | ..................... 358/1.14 |
| 8,032,048 | B2 * | 10/2011 | Monde | ............................ 399/70 |
| 2002/0143924 | A1 | 10/2002 | Iga | |
| 2007/0236721 | A1 | 10/2007 | Okamoto | |

FOREIGN PATENT DOCUMENTS

| | | |
|---|---|---|
| JP | 2000-148615 A | 5/2000 |
| JP | 2004-153742 A | 5/2004 |
| JP | 2006262096 | 9/2006 |
| JP | 2007-281781 A | 10/2007 |

\* cited by examiner

*Primary Examiner* — Paul F Payer
(74) *Attorney, Agent, or Firm* — Rabin & Berdo, P.C.

(57) ABSTRACT

An image forming apparatus has a network interface unit for communication with an electronic mail server via a communication network, a main control unit that entirely controls the image forming apparatus and does not operate in a power-saving mode, and a sub control unit that inquires of the electronic mail server in the power-saving mode about whether an electronic mail addressed to the image forming apparatus is stored in the electronic mail server. When such an electronic mail is stored in the electronic mail server, the sub control unit activates the main control unit. The main control unit shifts the image forming apparatus from the power-saving mode to a normal mode, and acquires the electronic mail from the electronic mail server. An image forming unit forms an image on a recording medium based on an attachment file attached to the electronic mail acquired by the main control unit.

17 Claims, 29 Drawing Sheets

FIG.3

| FUNCTION BLOCK | NORMAL MODE | SLEEP MODE |
|---|---|---|
| MAIN PROCESSOR 101 | ON | OFF |
| RAM 102 | ON | OFF |
| ROM 103 | ON | OFF |
| IMAGE PROCESSING UNIT 104 | ON | OFF |
| IMAGE FORMING UNIT 105 | ON | OFF |
| INTER-PROCESSOR COMMUNICATION CONTROL UNIT 107 | ON | OFF |
| NETWORK I/F UNIT 108 | ON | ON |
| SUB PROCESSOR 109 | ON | ON |
| RAM 110 | ON | ON |
| SWITCHING CONTROL UNIT 111 | ON | ON |
| FIRST PROGRAM STORAGE UNIT 112 | ON | OFF |
| SECOND PROGRAM STORAGE UNIT 113 | OFF | ON |
| POWER CONTROL UNIT 106 | ON | OFF |

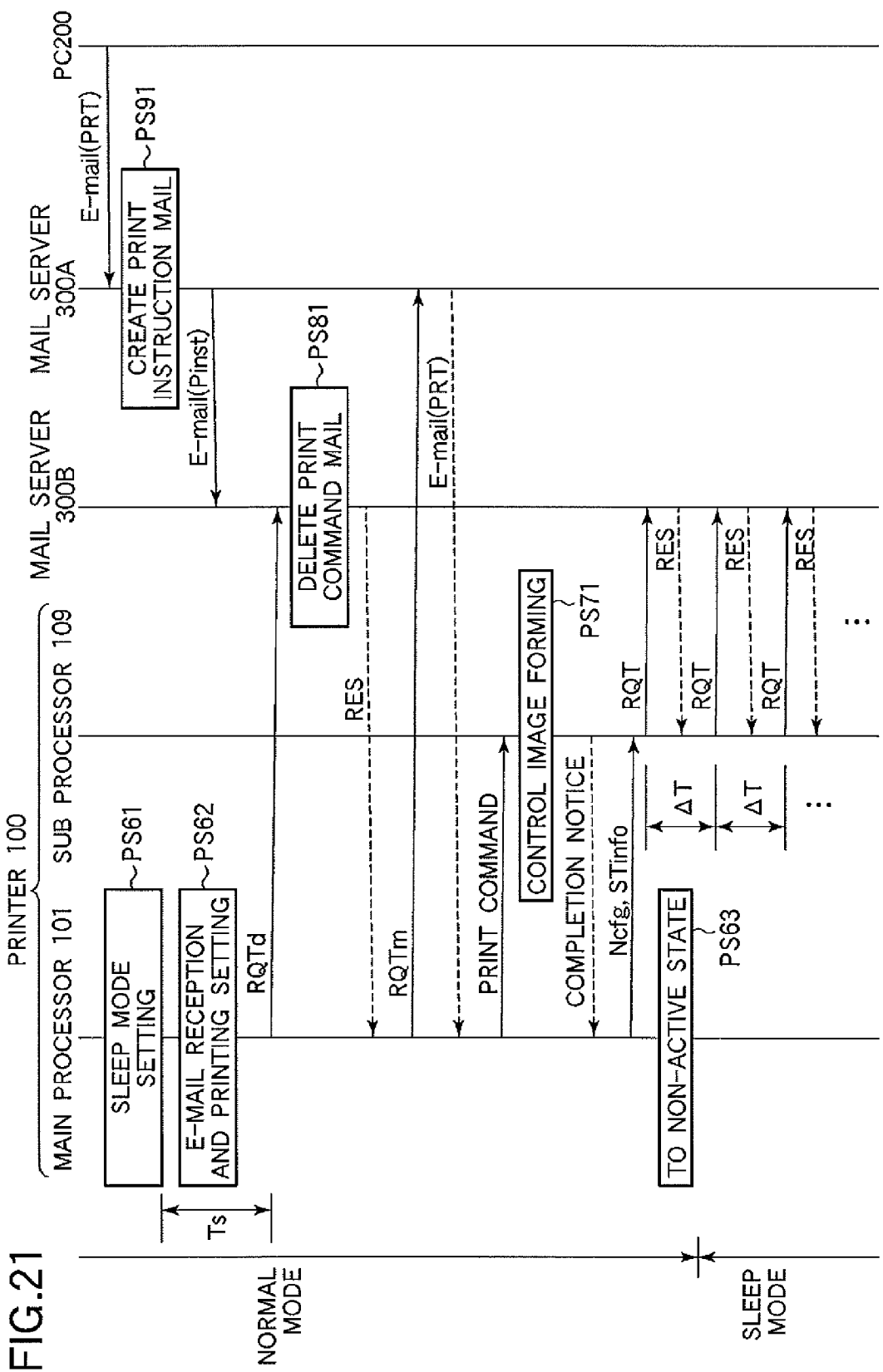

From: user1@net2.com
To: printdata@net1.com
Subject: SAMPLE
Mime-Version: 1.0
Content-Type: multipart/mixed; boundary=SAMPLE_BOUNDARY −SAMPLE-BOUNDARY
Content-Type: text/plain; charset=us ascii

PRINT THE ATTACHMENT FILE.

−SAMPLE-BOUNDARY
Content-Type: application/octet-stream:name= "test1 .pdf"
Content-Transfer-Encoding: base64
Content-Disposition:attachment:filename= "test1 .pdf"

AAANAAAAAAAGEQBKDYIllyyAAAAABBBBDISSSAAATIAAAAAGPgDKIKKS
SyGDIAAAAABEAAAGMgAAA

−SAMPLE-BOUNDARY−

From: printdata@net1.com
To: printinfo@net1.com
Subject: ORDER
Mime-Version: 1.0
Content-Type: text/plain; charset=us ascii

ORDER:PRINT

E-MAIL RECEPTION AND PRINTING

- ENABLE/DISABLE  ⎯611

● ENABLE   ○ DISABLE

- E-MAIL RECEPTION INTERVAL

[ 60 ] MINUTES

RECEIVING SERVER SETTING

- SERVER ADDRESS    [ 192.168.0.1 ] ~613

- USER-ID (PRINT DATA)    [ printdata ] ~614

- PASSWORD (PRINT DATA)    [ ******* ] ~615

- USER-ID (INSTRUCTION INFORMATION)    [ printinfo ] ~616

- PASSWORD (INSTRUCTION INFORMATION)    [ ******* ] ~617

SENDING SERVER SETTING

- SERVER ADDRESS    [ 192.168.0.1 ] ~1401

[ CONFIRM ] 618   [ CANCEL ] 619

From: user1@net2.com
To: printinfo@net1.com
Subject: ORDER
Mime-Version: 1.0
0 Content-Type: text/plain; charset=us ascii

ORDER:STATUS

From: printinfo@net1.com
To: user1@net2.com
Subject: Re:ORDER
Mime-Version: 1.0
Content-Type: text/plain; charset=us ascii

STATUS: SLEEP MODE

IMAGE FORMING APPARATUS AND IMAGE FORMING SYSTEM WITH POWER-SAVING MODE

BACKGROUND OF THE INVENTION

The present invention relates to a technology for forming an image on a recording medium according to an electronic file sent via an electronic mail system.

Recently, facsimile communications via an IP (Internet Protocol) communication line have become common. One of such facsimile communications uses an electronic mail system. To be more specific, a sending terminal sends an electronic mail (hereinafter, referred to as E-mail) with an attachment file in TIFF (Tag Image File Format) or PDF (Portable Document Format) to a receiving terminal having a printing function. The receiving terminal receives the E-mail from the sending terminal via a mail server, and forms (i.e., prints) an image on a recording medium according to the attachment file of the E-mail. There have recently been digital multifunction peripherals having a scanner function, a printing function, a copying function, and the above described facsimile communication function (see, for example, Patent Publication No. 1).

In the facsimile communication using the E-mail system, it is necessary to send an inquiry command to the mail server about presence or absence of E-mail with an attachment file in the mail server. Convenience can be enhanced by increasing a frequency of sending the inquiry commands. However, if the frequency of sending the inquiry commands to the mail server and receiving response messages from the mail server increases, electric power consumption of the receiving terminal increases.

In order to reduce an increase of such electric power consumption, Patent Publication No. 1 discloses a digital multifunction peripheral having a standby mode and a power-saving mode. In the standby mode, all of the functions of the digital multifunction peripheral can be immediately started by an operation by a user. In the power-saving mode, several functions of an operation panel and the like are disabled or restricted. The digital multifunction peripheral is configured to send the inquiry command to the mail server (about the presence or absence of E-mail with an attachment file) during the power-saving mode, so as to reduce electric power consumption.

Patent Publication No. 1: Japanese Laid-open Patent Publication No. 2006-262096.

However, in the conventional power-saving mode, only several functions of the operation panel and the like are disabled or restricted. Therefore, a sufficient power saving effect cannot be achieved.

SUMMARY OF THE INVENTION

In an aspect of the present invention, it is intended to provide an image forming apparatus and an image forming system capable of forming an image on a recording medium according to an attachment file attached to an electronic mail and achieving a sufficient power saving effect.

According to an aspect of the present invention, there is provided an image forming apparatus having a normal mode and a power-saving mode. The image forming apparatus includes a network interface unit for communication with an electronic mail server connected to a communication network, a main control unit that controls an entire operation of the image forming apparatus, the main control unit being configured not to operate in the power-saving mode, a sub control unit that performs an inquiry to the electronic mail server via the network interface unit in the power-saving mode about presence or absence of an electronic mail addressed to the image forming apparatus in the electronic mail server, and an image forming unit that forms an image on a recording medium. When the sub control unit judges that an electronic mail addressed to the image forming apparatus is stored in the electronic mail server based on a result of the inquiry, the sub control unit activates the main control unit to cause the image forming apparatus to shift from the power-saving mode to the normal mode. After the main control unit causes the image forming apparatus to shift from the power-saving mode to the normal mode, the main control unit acquires the electronic mail from the electronic mail server via the network interface unit. The image forming unit forms an image on the recording medium according to an attachment file attached to the electronic mail acquired by the main control unit.

With such features, it becomes possible to form the image on the recording medium according to the attachment file attached to the electronic mail with low power consumption and without sacrificing convenience.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIG. 3 shows a list of operation states of respective function blocks of the printer in a normal mode and in a sleep mode according to Embodiment 1;

FIG. 21 shows an example of a processing sequence of an image forming system according to Embodiment 3;

FIG. 22 shows an example of a content of an E-mail with an attachment file;

FIG. 23 shows an example of a content of a print instruction mail;

FIG. 27 shows an example of an E-mail-reception-and-printing setting screen according to Embodiment 4 of the present invention;

FIG. 31 shows an example of a content of a status request mail, and

FIG. 32 shows an example of a content of an E-mail containing a description of status information (STinfo).

DETAILED DESCRIPTION OF THE PREFERRED EMBODIMENT

Hereinafter, embodiments of the present invention will be described with reference to drawings.

Embodiment 1

Figure 1:
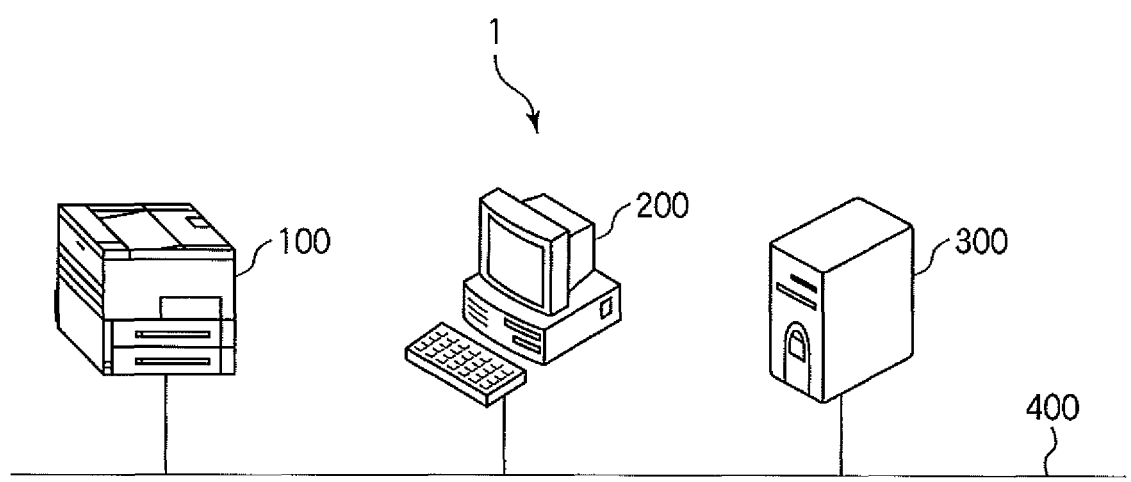
FIG. 1 is a schematic sectional view showing a constitution of an image forming system according to Embodiment 1 of the present invention.

FIG. 1 is a schematic view showing an example of a constitution of an image forming system 1 according to Embodiment 1 of the present invention. As shown in FIG. 1, the image forming system 1 includes a printer (i.e., an image forming apparatus) 100, a personal computer (PC) 200 and a server device 300. The printer 100, the PC 200 and the server device 300 are connected to a communication network 400. As the communication network, for example, LAN (Local Area Network) or WAN (Wide Area Network) can be used. The printer 100, the PC 200 and the server device 300 respectively have network interface functions capable of communicating with each other (or other devices) via the communication network 400.

The server device 300 has a server function for sending and receiving electronic mails (i.e., E-mails) using IETF (Internet Engineering Task Force)—standard protocols such as SMTP (Simple Mail Transfer Protocol) or POP3 (Post Office Protocol—Version 3). In this example, the server device 300 has functions of an E-mail sending server and an E-mail receiving server. However, the embodiment is not limited to such an example. It is also possible that separate communication devices connected to the communication network 400 respectively have the functions of the E-mail sending server and the E-mail receiving server.

The PC 200 has a function of an E-mail sending client for sending E-mails (addressed to an E-mail address of the printer 100) to the printer 100 using the server device 300, and a function of an E-mail receiving client function for receiving E-mails (addressed to an E-mail address of the PC 200) from the server device 300.

The server device 300 and the PC 200 are able to communicate with each other using an encrypted communication such as a secret key cryptosystem or a public key cryptosystem, electronic signature or electronic certificate. For example, the server device 300 and the PC 200 are able to communicate with each other using encrypted communication by means of a known encrypted communication protocol such as SSL (Secure Sockets Layer)/TLS (Transport Layer Security) or S/MIME (Secure MIME). The server device 300 and the printer 100 are able to communicate with each other in a similar manner to the communication between the server device 300 and the PC 200.

A user can send an E-mail with an attachment file to the printer 100 using the E-mail sending client function of the PC 200. As described later, the printer 100 has a function to receive a data of an E-mail (addressed to the printer 100) from the server device 300, and to form an image on a recording medium such as a paper according to an attachment file attached to the E-mail.

Further, the user can send an E-mail (addressed to the E-mail address of the printer 100) to the printer 100 using the E-mail sending client function of the PC 200 for inquiring a current status of the printer 100 (for example, current settings or operating conditions). In response to the E-mail from the PC 200, the printer 100 has a function to send a response E-mail to the PC 200 containing a description of a current status of the printer 100 as described later. Based on the description of the response E-mail, the user of the PC 200 can easily recognize whether the printer 100 is operating correctly, or is experiencing a failure such as a lack of paper or low amount of toner.

Figure 2:
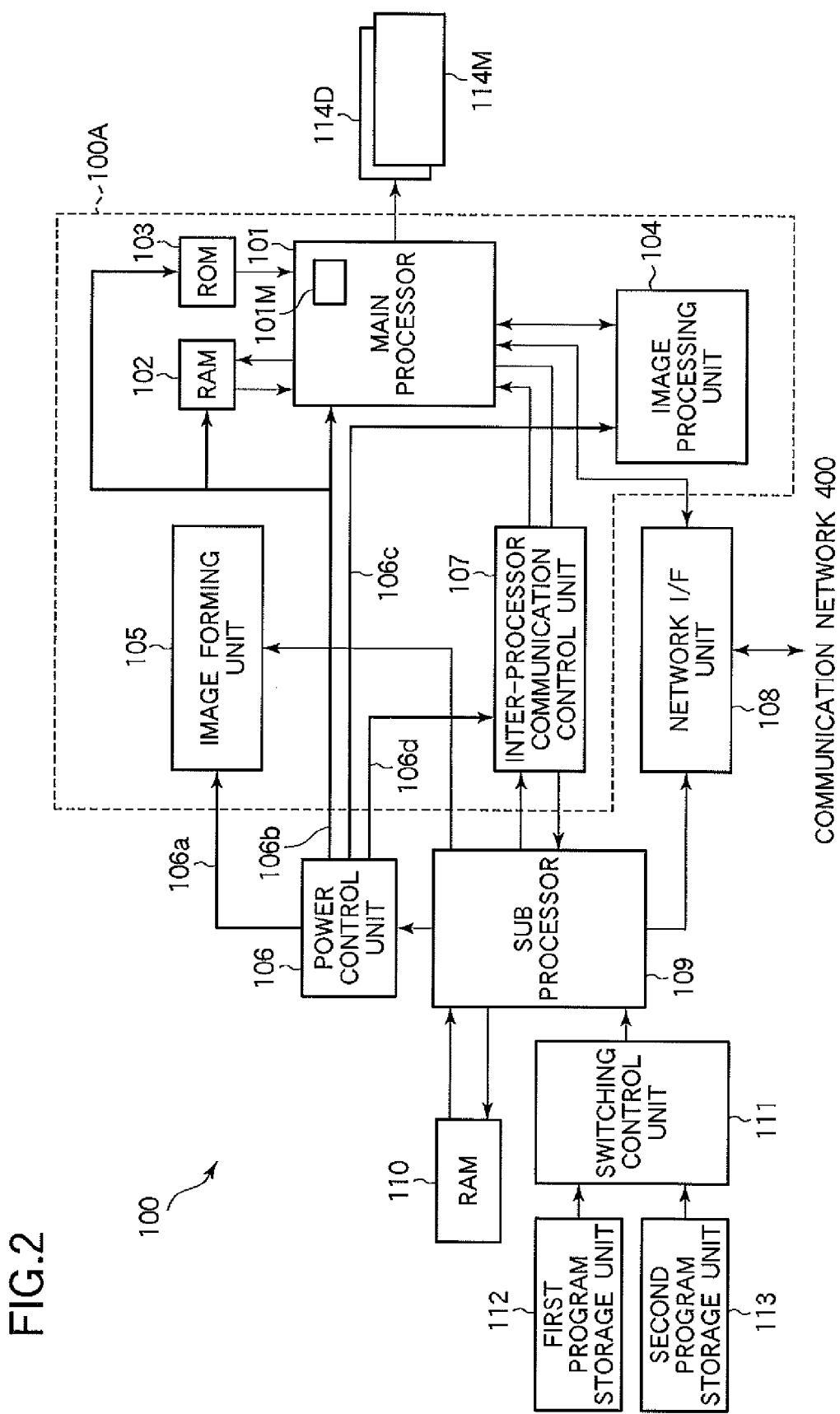
FIG. 2 is a function block diagram schematically showing a constitution of a printer according to Embodiment 1.

FIG. 2 is a function block diagram schematically showing a constitution of the printer 100. The printer 100 has two kinds of operation modes: a normal mode and a sleep mode. The sleep mode is an example of a power-saving mode. In this embodiment, the printer 100 is used as a page printer. As shown in FIG. 2, the printer 100 has a main function unit 100A including a main processor 101, and a sub processer 109. The main function unit 100A includes the main processer 101 that controls an entire operation of the printer 100 in the normal mode, a RAM (Random Access Memory) 102, a ROM (Read Only Memory) 103, an image processing unit 104 that performs image processing on an image data, and an image forming unit 105 that forms (prints) an image on a recording medium such as a paper. The printer 100 further includes a display unit 114D and an operation input unit 114M. The main processer 101, the RAM 102 and the ROM 103 constitute a main control unit. The sub processer 109 and a RAM 110 constitute a sub control unit.

The RAM 102 is a working memory used for data processing and control processing by the main processor 101. The ROM 103 stores commands for data processing and control processing. The main processor 101 is able to perform data processing and control processing by retrieving commands from the ROM 103. The image processing unit 104 has a function to convert an inputted data into an image data having a printable format by performing image processing such as expansion/contraction processing, color conversion or dither processing on the inputted data.

The display unit 114D includes a compact display device such as an LCD (Liquid Crystal Display). The main processor 101 is able to cause the display unit 114 to display information indicating operating conditions of the printer 110 or information for setting conditions. The operation input unit 114M is a touch-sensitive input device (i.e., a touch-panel) provided in the vicinity of a display screen of the display unit 114D. When a user touches the display screen of the display unit 114D with a finger or a pointing device, the operation input unit 114M outputs coordinate information of a touched position or information corresponding thereto to the main processor 101. The main processor 101 performs data processing and control processing according to information inputted via the operation input unit 114M.

An inter-processor communication control unit 107 is a circuit that controls sending and receiving of data and command between the main processor 101 and the sub processor 109.

The sub processor 109 operates with lower power consumption than the main processor 101, and controls the image forming unit 105, a power control unit 106 and a network interface (I/F) unit 108. The RAM 110 is a working memory used for control processing by the sub processor 109. When the printer 100 operates in the normal mode, the sub processor 109 controls the image forming unit 105 and the power control unit 106 according to a command from the main processor 101, while the network I/F unit 108 is controlled by the main processor 101. When the printer 100 operates in the sleep mode, the main function unit 100A including the main processor 101 stops operating. In this state, the network I/F unit 108 is controlled by the sub processor 109.

A first program storage unit 112 and a second program storage unit 113 are memories for storing control commands performed by the sub processor 109. The first program storage unit 112 stores control commands performed by the sub processor 109 in the normal mode. The second program storage unit 113 stores control commands performed by the sub processor 109 in the sleep mode. The control commands stored in the second program storage unit 113 include commands for controlling the network I/F unit 108 and protocol stack for communicating with other devices via the communication network 400. A switching control unit 111 retrieves control commands from either of the first program storage unit 112 and the second program storage unit 113 and supplies the control commands to the sub processor 109, in response to a switching control command from the main processor 101 via a not shown control line.

The image forming unit 105 operates in the normal mode under control of the sub processor 109, and forms (prints) an image on the recording medium based on an image data having a printable format. For example, the image forming unit 105 can be configured to perform image formation process using electrophotography.

The power control unit 106 is a power circuit for controlling power supply to all of the components of the printer 100. The power control unit 106 individually controls power supply to the components 101, 102, 103, 104, 105 and 107 of the main function unit 100A via power source lines 106a, 106b, 106c and 106d shown in FIG. 2, in response to a command from the sub processor 109 or the main processor 101. In the normal mode, the power control unit 106 performs power supply to the main function unit 100A. In the sleep mode, the power control unit 106 restricts power supply to the main function unit 100A to stop operations of the components 101, 102, 103, 104, 105 and 107 of the main function unit 100A.

FIG. 3 shows a list of operation states of respective function blocks of the printer 100 in the normal mode and in the sleep mode. In FIG. 3, when a function block is supplied with power and operates, the state of the function block is expressed as "ON", i.e., an active state. When a function block is not supplied with power (or supplied with restricted power) and stops operating, the state of the function block is expressed as "OFF", i.e., a non-active state. In this regard, in the sleep mode, only part of the power control unit 106 controlling the power supply to the main function unit 100A is placed in the non-active state.

Figure 4:
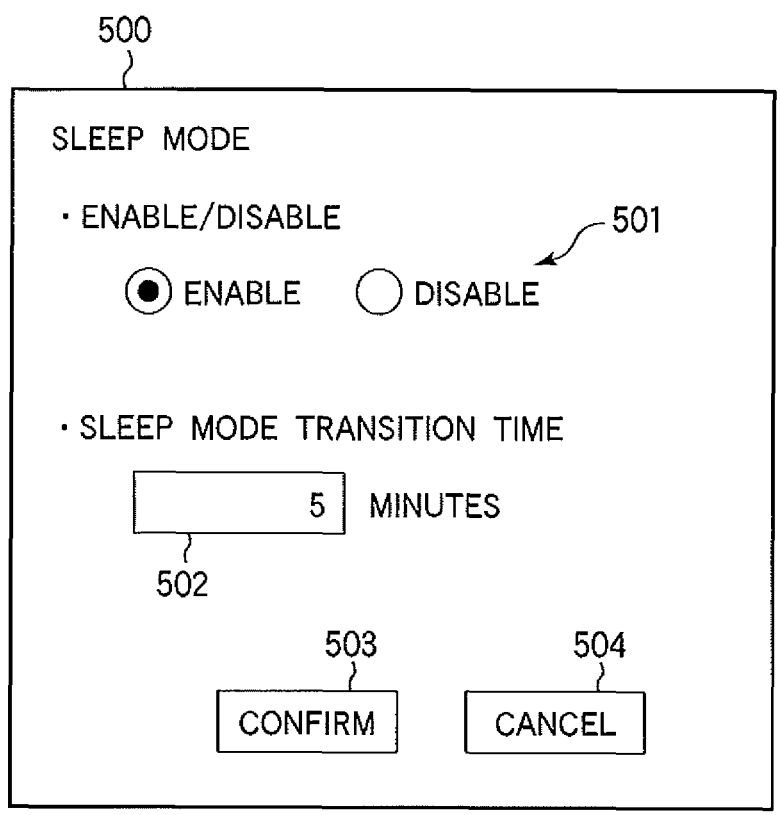
FIG. 4 shows an example of a sleep mode setting screen according to Embodiment 1.

FIG. 4 shows an example of a sleep mode setting screen 500 displayed by the display unit 114D. The main processor 101 performs a sleep mode setting processing to create the sleep mode setting screen 500 and causes the display unit 114D to display the sleep mode setting screen 500. The sleep mode setting screen 500 includes a radio button 501 for selecting between enabling ("enable") and disabling ("disable") of the sleep mode, an input box 502 for setting a sleep mode transition time, a confirming button 503 for confirming inputted settings and for storing the settings in a nonvolatile memory (i.e., a configuration information storage unit) 101M, and a cancel button 504 for cancelling the sleep mode setting processing.

The user can enable the sleep mode by operating the operation input unit 114M to select the radio button 501 "enable" of the sleep mode setting screen 500 and to press the confirmation button 503, and can set the sleep mode transition time (minutes) using the input box 502. After the user presses the confirmation button 503, when the sleep mode transition time is reached, the main processor 101 causes the printer 101 to shift from the normal mode to the sleep mode. In contrast, the user can disable the sleep mode by operating the operation input unit 114M to select the radio button 501 "disable" of the sleep mode setting screen 500 and to press the confirmation button 503. In such a case, the printer 101 does not shift from the normal mode to the sleep mode even when the sleep mode transition time is reached.

Figure 5:
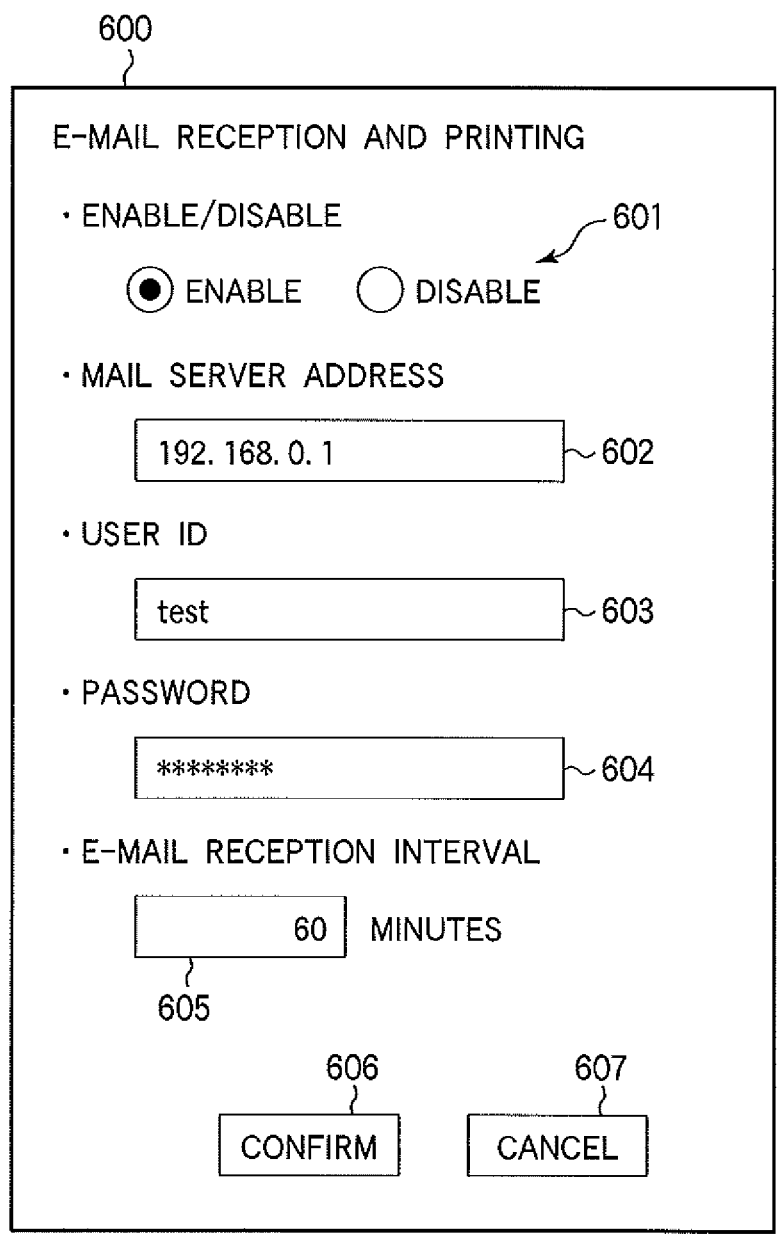
FIG. 5 shows an example of an E-mail-reception-and-printing setting screen according to Embodiment 1.

FIG. 5 shows an example of an E-mail-reception-and-printing setting screen 600 displayed by the display unit 114D. The main processor 101 performs the E-mail-reception-and-printing setting processing and causes the display unit 114D to display the E-mail-reception-and-printing setting screen 600. The E-mail-reception-and-printing setting screen 600 includes a radio button 601 for selecting between enabling ("enable") and disabling ("disable") of an E-mail-reception-and-printing function, an input box 602 for setting a network address (i.e., a mail server address) of the server device 300 (i.e., a mail server), an input box 603 for setting a user identifier (i.e., a user ID) registered in the server device 300, an input box 604 for setting a certification password registered in the server device 300, and an input box 605 for setting a time interval of reception of E-mails (i.e., a time interval for inquiry about presence or absence of E-mail in the server device 300) by minutes. Further, the E-mail-reception-and-printing setting screen 600 includes a confirmation button 606 for confirming inputted settings and for storing the settings in the nonvolatile memory 101M, and a cancel button 607 for cancelling (stopping) the E-mail-reception-and-printing setting processing.

The user can enable a function of the E-mail-reception-and-printing processing (described later) by operating the operation input unit 114M to select the radio button 601 "enable" of the E-mail-reception-and-printing setting screen 600 and to press the confirmation button 603 and by inputting settings in the input boxes 602 through 605. In contrast, the user can disable the function of the E-mail-reception-and-printing processing by operating the operation input unit 114M to select the radio button 601 "disable" a function of the E-mail-reception-and-printing setting screen 600 and to press the confirmation button 603.

Figure 6:
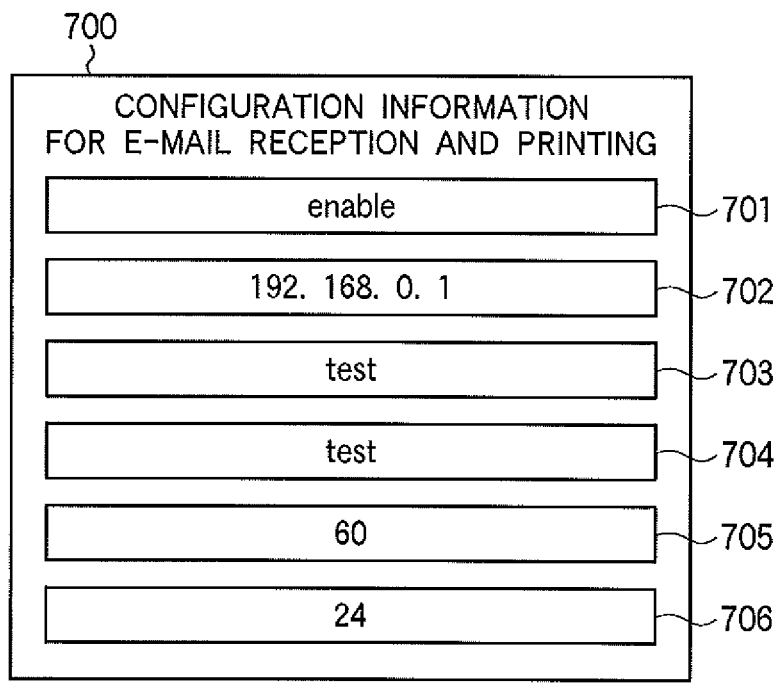
FIG. 6 shows an example of a data structure of information set using the E-mail-reception-and-printing setting screen shown in FIG. 5.

FIG. 6 shows an example of a data structure of configuration information 700 set using the E-mail-reception-and-printing setting screen 600. As shown in FIG. 6, the configuration information 700 includes a value 701 indicating "enable" or "disable", a mail server address 702, a user ID 703 used when sending the inquiry to the sever device 300 about the presence or absence of E-mail, a certification password 704, a time interval 705 to receive E-mails (i.e., E-mail reception time interval ΔT), and a remaining time 706 (minutes) before sending next inquiry command to the server device 300, which are set using the E-mail-reception-and-printing setting screen 600 of FIG. 5. In the configuration information 700 shown in FIG. 6, the value 701 is set to a value indicating "enable".

Figure 7:
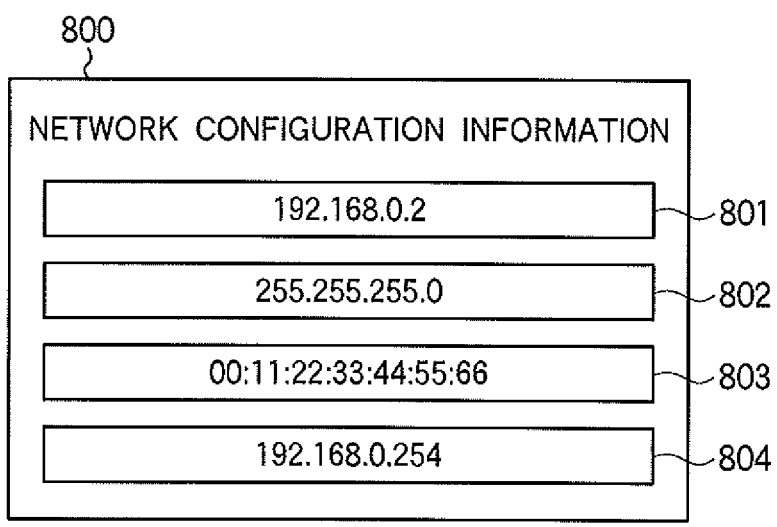
FIG. 7 shows an example of a data structure of network configuration information of the printer.

FIG. 7 shows an example of a data structure of network configuration information 800 of the printer 100 (or the network I/F unit 108). As shown in FIG. 7, the network configuration information 800 includes an IP (Internet Protocol) address 801 and a subnet mask 802 which are assigned to the printer 100 (or the network I/F unit 108), and a MAC (Media Access Control) address 803 and a gateway address 804 which are specific to the printer 100 (or the network I/F unit 108).

Figure 8:
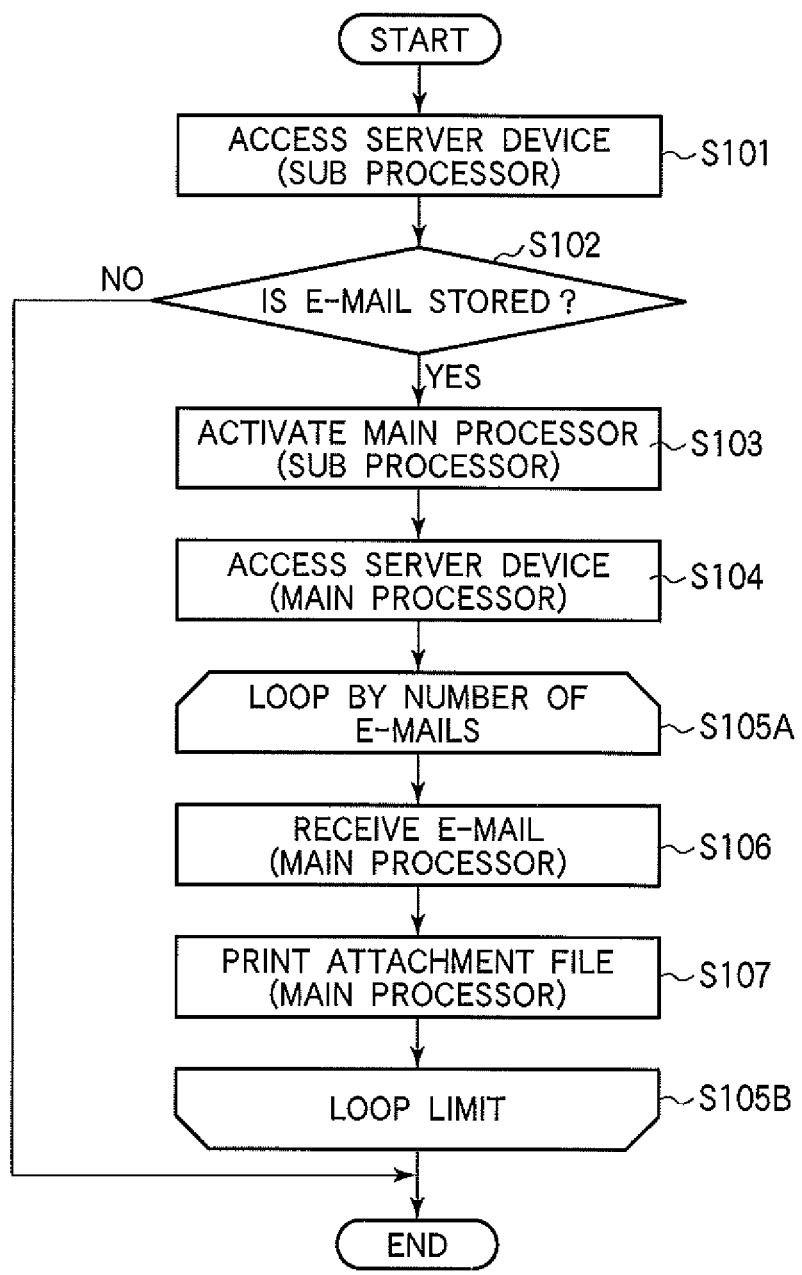
FIG. 8 is a flow chart schematically showing an E-mail-reception-and-printing processing according to Embodiment 1.
Figure 9:
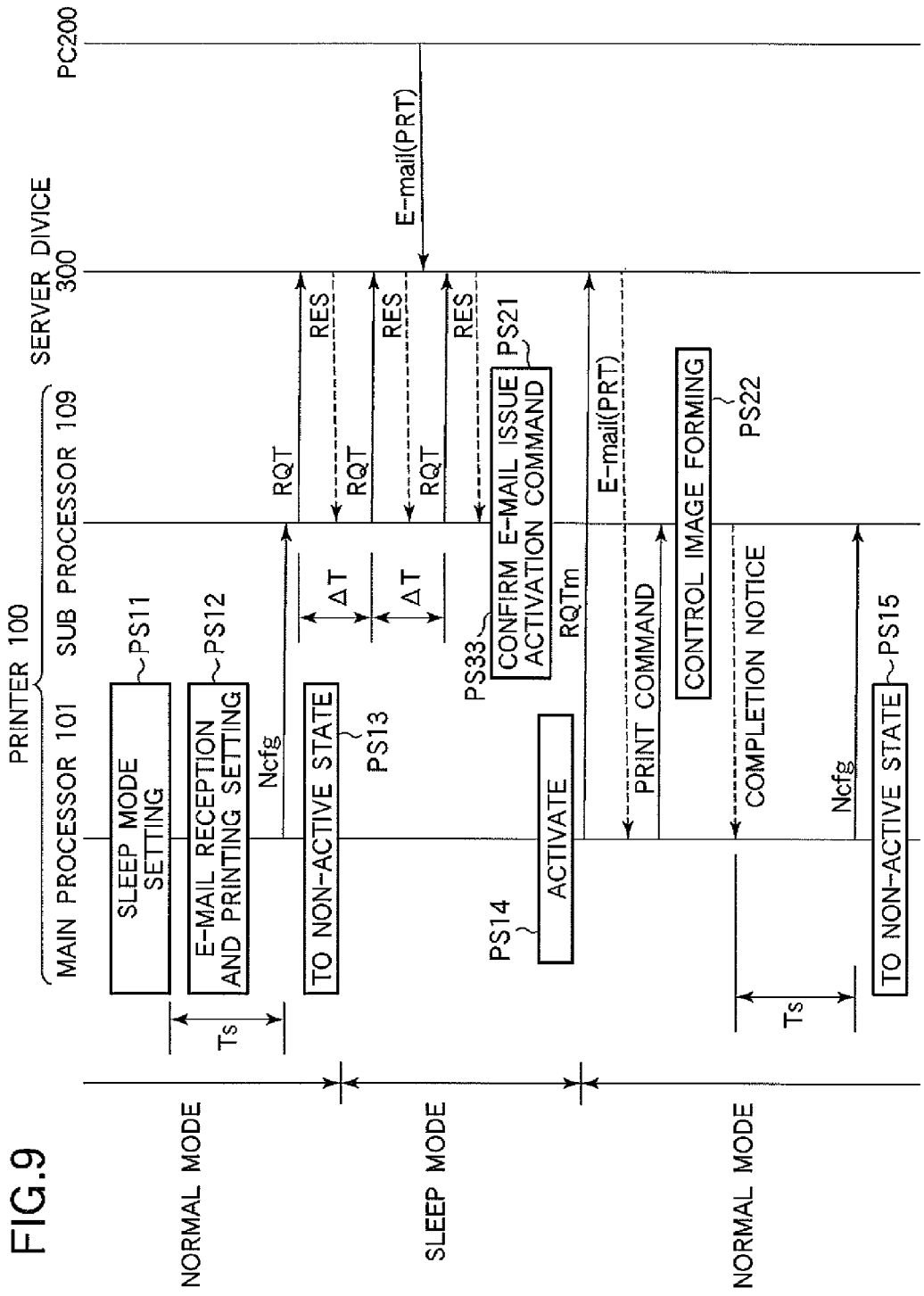
FIG. 9 shows an example of a processing sequence of the image forming system according to Embodiment 1.

An operation of the printer 100 having the above described configuration will be described with reference to FIGS. 8 and 9. FIG. 8 is a flow chart schematically showing the E-mail-reception-and-printing processing. FIG. 9 shows an example of a processing sequence of the image forming system 1 according to Embodiment 1.

After the printer 100 is turned on, the printer 100 operates in the normal mode. When the user operates the operation input unit 114M to input an instruction to proceed with the sleep mode setting, the main processor 101 creates the sleep mode setting screen 500 in response to the instruction, and causes the display unit 114D to display the sleep mode setting screen 500. The user inputs configuration information (i.e., settings) via the sleep mode setting screen 500 (step PS11 in FIG. 9). Then, when the user operates the operation input unit 114M to inputs an instruction to proceed with the E-mail reception-and-printing setting, the main processor 101 creates the E-mail-reception-and-printing setting screen 600 in response to the instruction, and causes the display unit 114D to display the E-mail-reception-and-printing setting screen 600. The user inputs configuration information (i.e., settings) via the E-mail-reception-and-printing setting screen 600 (step PS12 in FIG. 9). Then, when the sleep mode transition time Ts set by the sleep mode setting processing (step PS11 in FIG. 9) is reached, the main processor 101 transfers the network configuration information (Ncfg) of FIG. 7 to the sub processor 109 via the inter-processor communication control unit 107 as shown in FIG. 9, and causes the printer 100 to shift from the normal mode to the sleep mode. As a result, the main processor 101 is placed in the non-active state (step PS13 in FIG. 9).

The sub processor 109 initializes the protocol stack and the network I/F unit 108 using the network configuration information (Ncfg), and starts the E-mail reception processing. First, as shown in FIG. 8, the sub processor 109 accesses the server device 300 (step S101). More specifically, the sub processor 109 establishes connection with the server device 300 using the network I/F unit 108, and sends a request RQT to the server device 300. The request RQT contains an inquiry command about the presence or absence of E-mail addressed to the printer 100 (i.e., addressed to the E-mail address of the printer 100) in the server device 300. In response to the request RQT from the sub processor 109, the server device 300 sends a response message RES indicating the presence or absence of E-mail addressed to the printer 100 in the server device 300 to the sub processor 109. Based on the response message RES from the server device 300, the sub processor 109 can judge that the presence or absence of E-mail addressed to the printer (i.e., the own apparatus) in the server device 300.

If no E-mail addressed to the printer 100 is stored in the server device 300 (NO in step S102), the sub processor 109 ends the E-mail-reception-and-printing processing of FIG. 8. Thereafter, when the E-mail reception time interval ΔT is reached, the sub processor 109 repeats the E-mail-reception-and-printing processing of FIG. 8. In this way, the sub processor 109 repeatedly sends the inquiry to the server device 300 (about the presence or absence of E-mail addressed to the printer 100) at the E-mail reception time interval ΔT during the sleep mode.

As shown in FIG. 9, when the server device 300 receives and stores an E-mail (PRT) addressed to the printer 100 sent from the PC 200, the sub processor 109 judges that the E-mail addressed to the printer 100 is stored in the server device 300 by performing the step S102 (YES in step S102) shown in FIG. 8. In this case, the sub processor 109 sends an activation command to the power control unit 106 to activate the main processor 109 (step S103 in FIG. 8, steps PS21 and PS14 in FIG. 9). More specifically, the power control unit 106 restarts power supply to the main function unit 100A including the main processor 101 in response to the activation command from the sub processor 109, so that the main processor 101 is activated. The sub processor 109 sends a print request command to the main processor 101 via the inter-processor communication control unit 107. Then, the sub processor 109 retrieves control commands for the normal mode from the first program storage unit 112 via the switching control unit 111, and performs the control commands.

In response to the print request command from the sub processor 109, the main processor 101 (placed in the active state) initializes the protocol stack and the network I/F unit 108 using the network configuration information (Nchg), and accesses the server device 300 (step S104 in FIG. 8). More specifically, the main processor 101 establishes connection with the server device 300 via the network I/F unit 108, and sends the inquiry command to the sever device 300 about the presence or absence of E-mail (addressed to the printer 100) in the server device 300, and acquires an E-mail list from the server device 300. Then, according to the E-mail list, the main processor 101 sends a reception request RQTm to the server device 300 to request the sever device 300 to send the E-mail (addressed to the printer 100) to the printer 100. In response to the reception request RQTm, the server device 300 sends the designated E-mail (PRT) to the printer 100. As a result, the main processor 101 receives the E-mail addressed to the printer 100 from the server device 300 (step S106 in FIG. 8).

Then, the main processor 101 performs printing according to the attachment file attached to the received E-mail (step S107 in FIG. 8). More specifically, the main processor 101 creates a printing image data from the attachment file attached to the received E-mail using the image processing unit 104. Then, the main processor 101 sends a print command to the sub processor 109 via the inter-processor communication control unit 107. In response to the print command from the main processor 101, the sub processor 109 controls an operation of the image forming unit 105 to form (print) an image on the recording medium according to the printing image data (step PS22 in FIG. 9). When the image formation is completed, the sub processor 109 sends a completion notice to the main processor 101 via the inter-processor communication control unit 107.

The main processor 101 repeatedly performs steps S106 and S107 (between steps S105A and S105B) in FIG. 8 until all of the E-mails listed in the E-mail list are received and corresponding images are formed on the recording medium. After the printing of the images corresponding to all of the E-mails listed in the E-mail list is completed, the E-mail-reception-and-printing processing shown in FIG. 8 is completed.

Thereafter, when the sleep mode transition time Ts is reached, the main processor 101 transfers the network configuration information (Ncfg) to the sub processor 109 via the inter-processor communication control unit 107, and causes the printer 100 to shift from the normal mode to the sleep mode. As a result, the printer 100 is placed in the non-active state (step PS15 in FIG. 9).

As described above, the printer 100 is constituted so that, in the sleep mode, the main function unit 100A including the main processor 101 stops operating, and the sub processor 109 checks the presence or absence of E-mail addressed to the printer 100 (i.e., the own apparatus) in the server device 300 (steps S101 and S102 in FIG. 8). When the sub processor 109 judges that the E-mail addressed to the printer 100 is stored in the server device 300 (YES in step S102), the sub processor 109 activates the main processor 101 (step S103). The main processor 101 acquires the E-mail (step S106), and performs printing of an image according to the attachment file attached to the E-mail (step S107). Therefore, the image formation (printing) using the E-mail system can be performed with low power consumption and without sacrificing convenience.

Embodiment 2

Next, Embodiment 2 of the present invention will be described. An image forming system of Embodiment 2 has the printer 100 as described in Embodiment 1. The printer 100 of Embodiment 2 has functions described in Embodiment 1, and also has a status-response function. The status-response function is to send a response mail indicating a current status such as operation conditions and settings of the printer 100 (i.e., the own apparatus), in response to a request from a client terminal (for example, the PC 200) of the E-mail system. Next, the status-response function of Embodiment 2 will be described.

Figure 10:
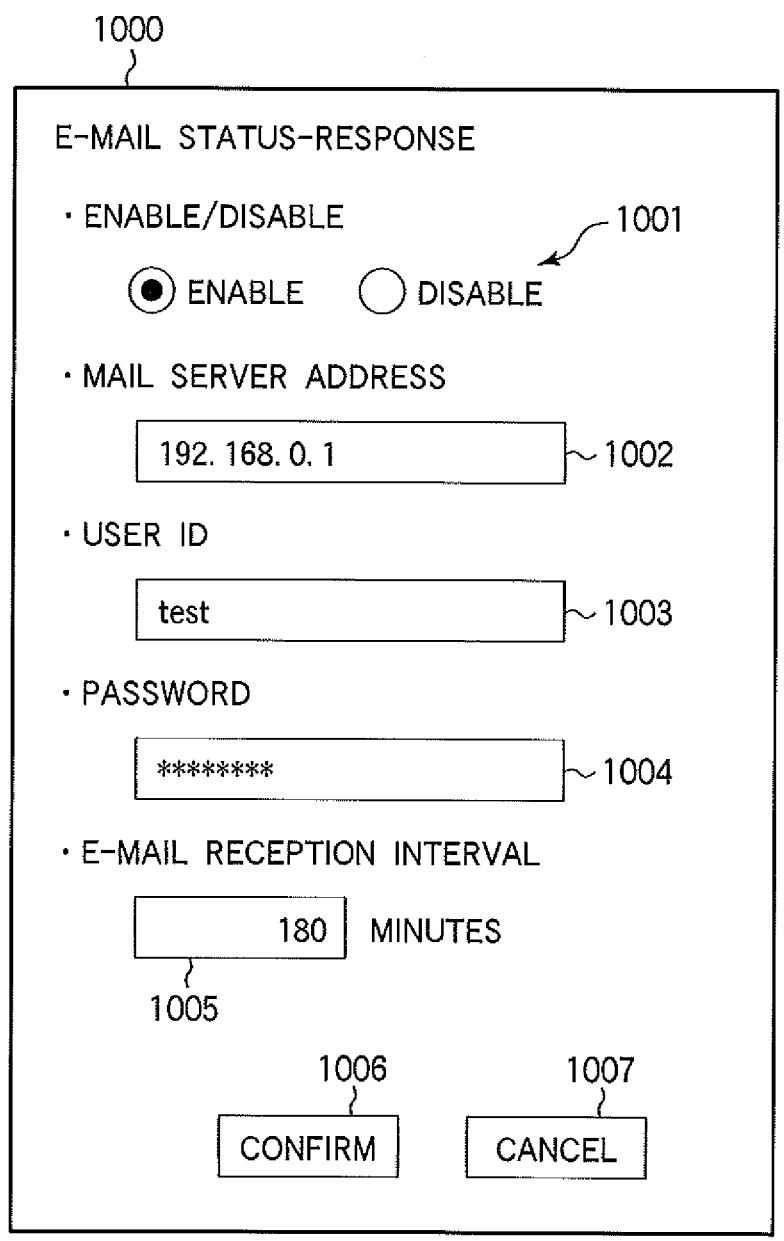
FIG. 10 shows an example of a status-response setting screen according to Embodiment 2.

FIG. 10 shows an example of a status-response setting screen 1000 displayed by the display unit 114D. The main processor 101 performs a status-response setting processing to create the status-response setting screen 1000 and causes the display unit 114D to display the status-response setting screen 1000. The status-response setting screen 1000 includes a radio button 1001 for selecting between enabling ("enable") and disabling ("disable") of the status-response function, an input box 1002 for setting a network address (i.e., a mail server address) of the server device 300 (as an electronic mail server), an input box 1003 for setting a user identifier (user ID) registered in the server device 300, an input box 1004 for setting a certification password registered in the server device 300, and an input box 1005 for setting a time interval of reception of E-mails (i.e., a time interval for inquiry about the presence or absence of E-mail in the server device 300) by minutes. Further, the status-response setting screen 1000 includes a confirmation button 1006 for confirming inputted settings and for storing the settings in the non-volatile memory 101M, and a cancel button 1007 for cancelling (stopping) the status-response setting processing.

The user can enable a status-response function by operating the operation input unit 114M to select the radio button 1001 "enable" of the status-response setting screen 1000 and to press the confirmation button 1006. In contrast, the user can disable the status-response function by operating the operation input unit 114M to select the radio button 1001 "disable" of the status-response setting screen 1000 and to press the confirmation button 1006.

Figure 11:
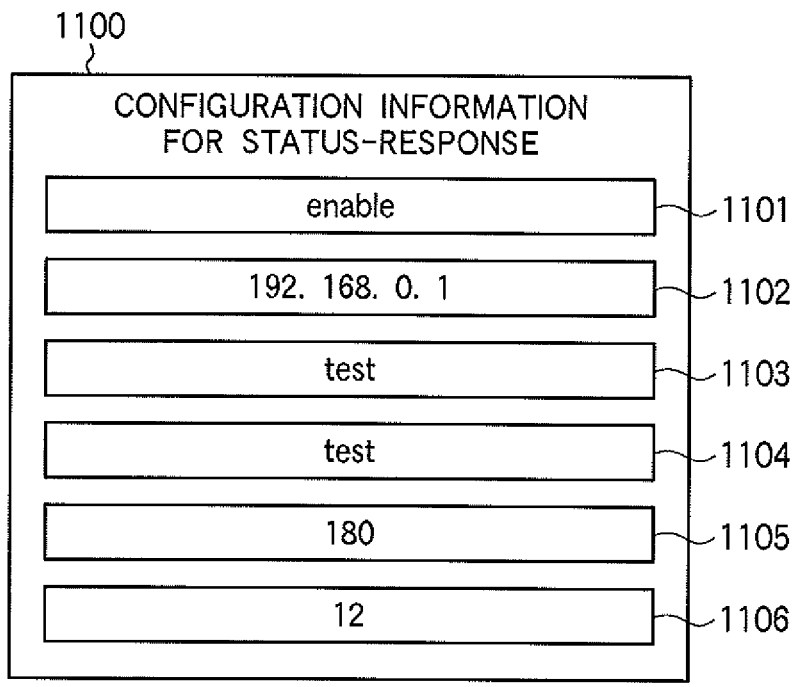
FIG. 11 shows an example of information set using the status-response setting screen shown in FIG. 10.

FIG. 11 shows an example of configuration information 1000 set using the status-response setting screen 1000 shown in FIG. 10. As shown in FIG. 11, the configuration information 1000 includes a value 1101 indicating "enable" or "disable", a mail server address 1102, a user ID 1103 used when sending the inquiry to the sever device 300 about the presence or absence of E-mail, a certification password 1104, a time interval 1105 to receive E-mails (i.e., E-mail reception time interval), a remaining time 1106 (minutes) before sending next inquiry command to the server device 300 about the presence or absence of E-mail, which are set using the status-response setting screen 1000 (FIG. 10). In the configuration information 1100 shown in FIG. 11, the value 1101 is set to a value indicating "enable".

Figure 12:
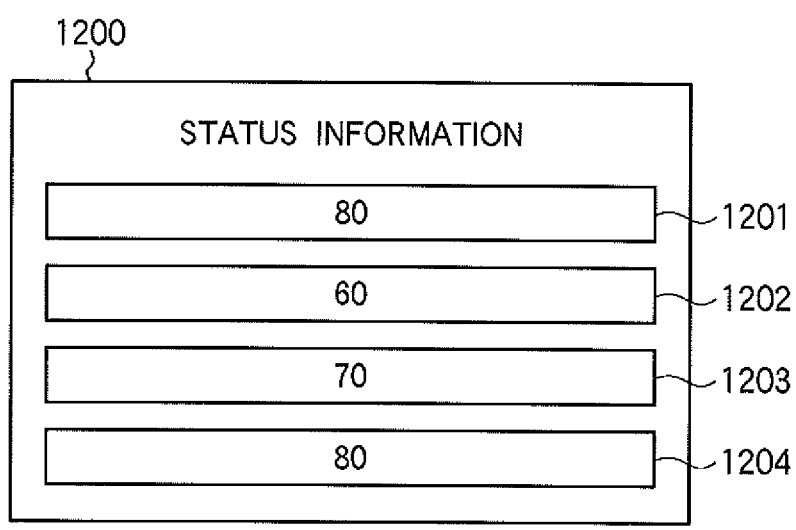
FIG. 12 shows an example of status information according to Embodiment 2.

FIG. 12 shows an example of status information 1200. In the case where the image forming unit 105 uses toners of four colors (for example, black, cyan, magenta and yellow), the status information 1200 includes residual amounts 1201, 1202, 1203 and 1204 of the respective toners as shown in FIG. 12 by percents. In this regard, the status information is not limited to that shown in FIG. 12. For example, it is possible that the status information includes information indicating a failure such as a lack of a paper or current configuration information.

Figure 13:
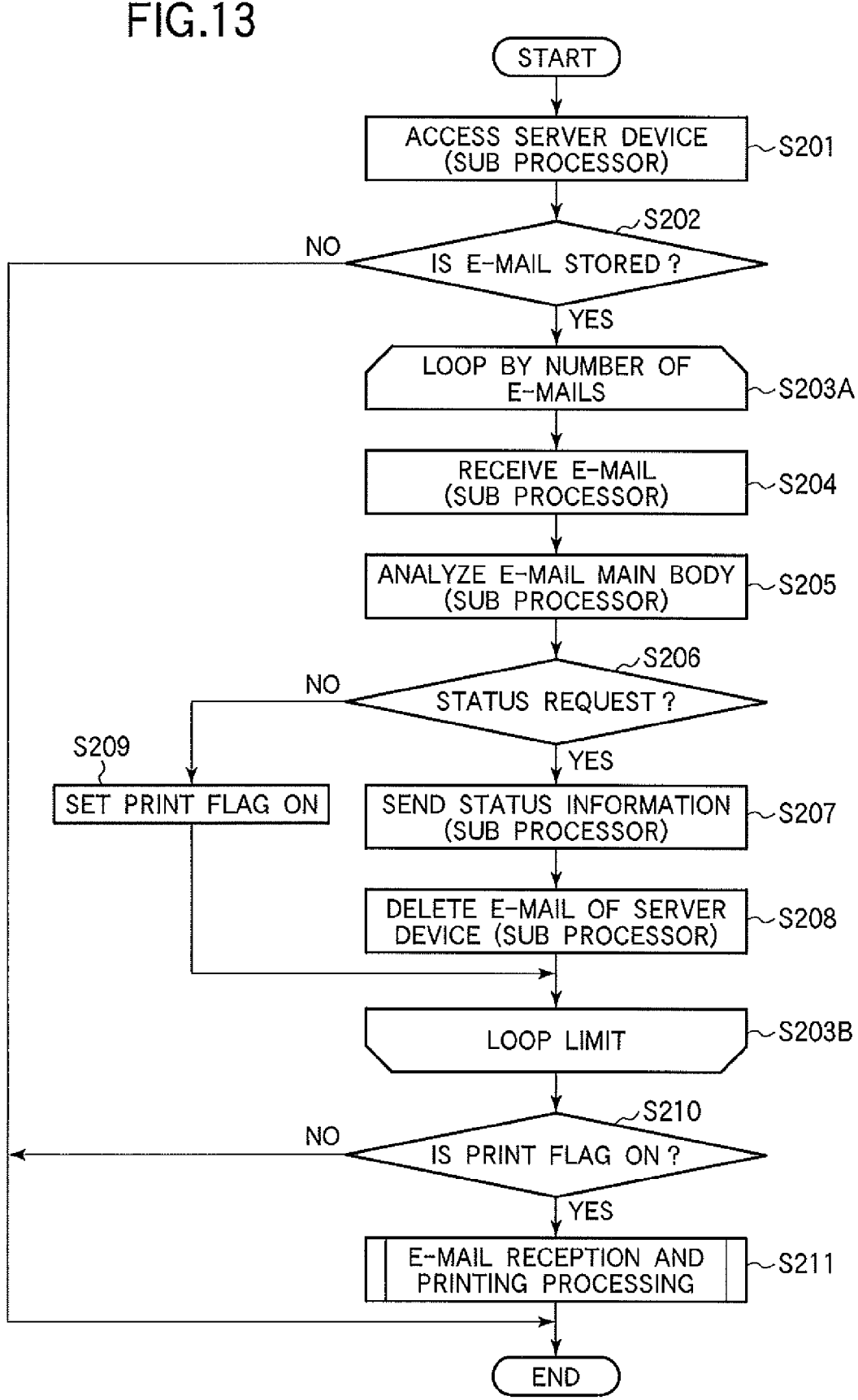
FIG. 13 is a flow chart schematically showing a main routine of a status-response processing according to Embodiment 2.
Figure 14:
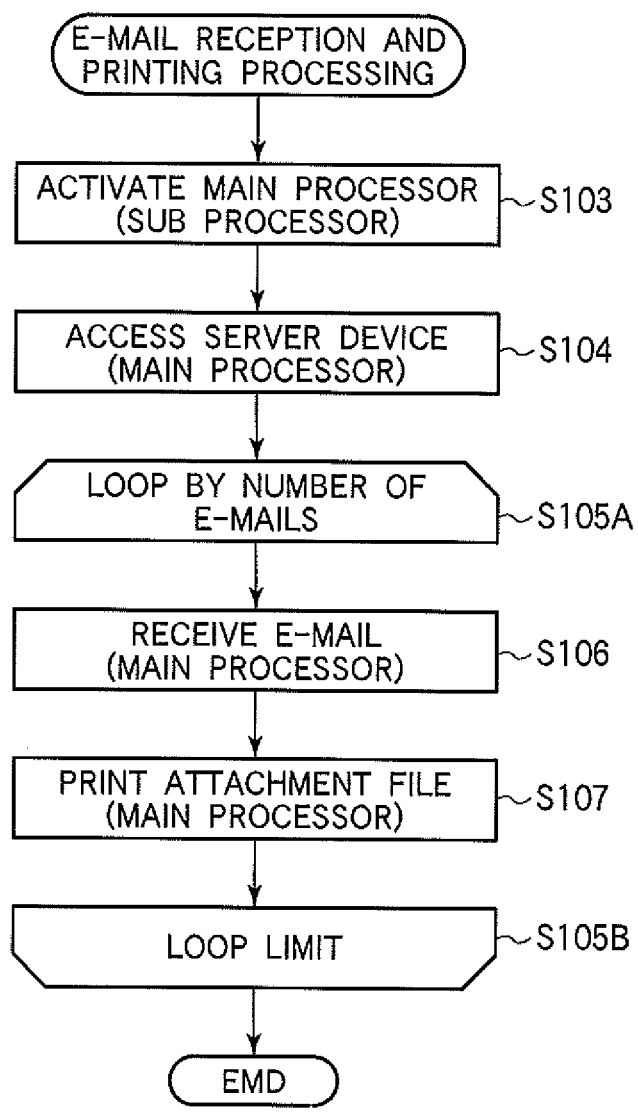
FIG. 14 is a flow chart schematically showing an E-mail-reception-and-printing processing according to Embodiment 2.
Figure 15:
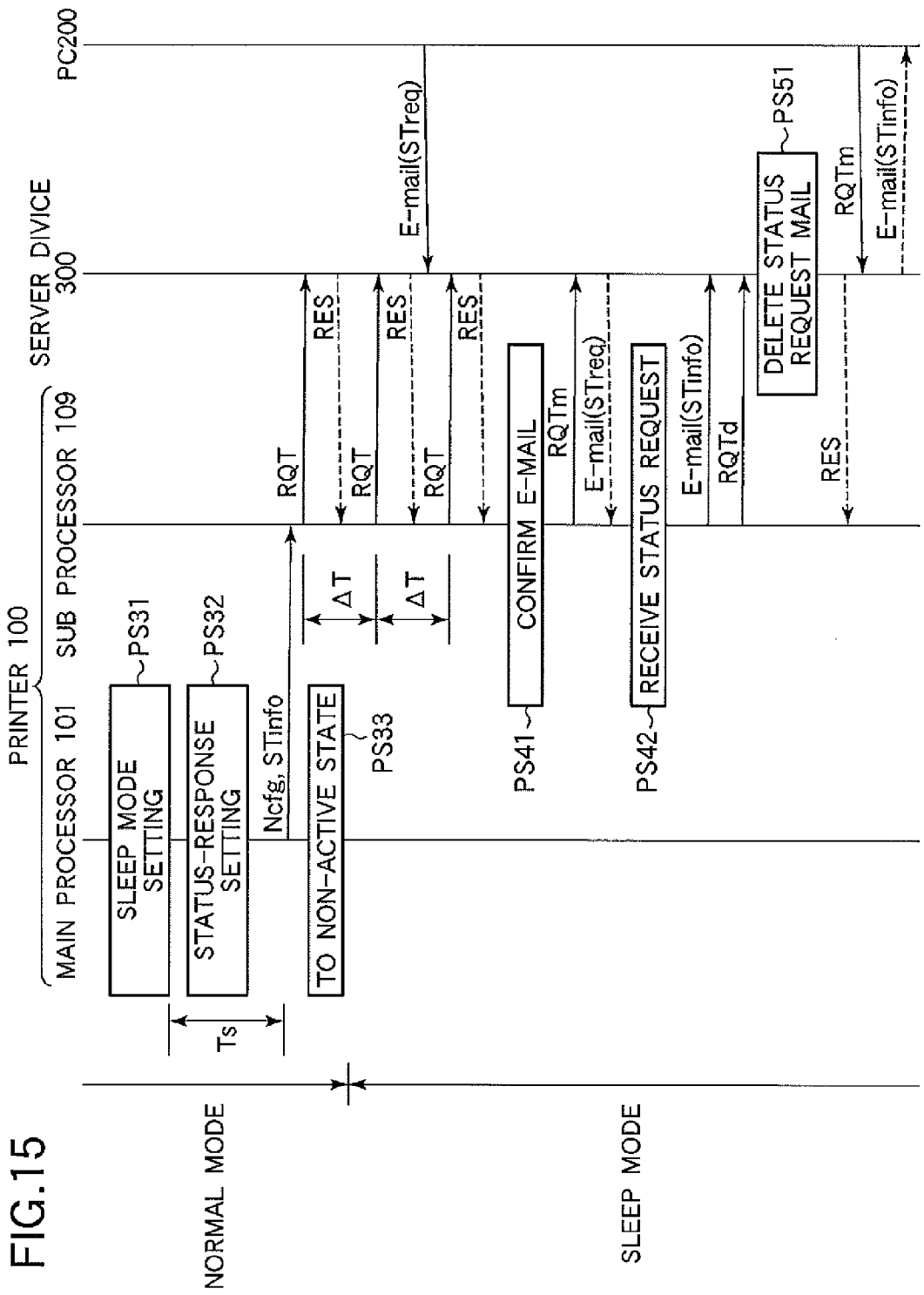
FIG. 15 is a schematic view showing a processing sequence of an image forming system according to Embodiment 2.

Next, the status-response processing according to Embodiment 2 will be described with reference to FIGS. 13 through 15. FIG. 13 is a flow chart schematically showing a main routine of the status-response processing. FIG. 14 is a flow chart schematically showing an E-mail-reception-and-printing processing (S210) in FIG. 13. FIG. 15 is a schematic view showing a processing sequence of an image forming system 1 according to Embodiment 2.

After the printer 100 is turned on, the printer 100 operates in the normal mode. As shown in FIG. 15, after the sleep mode setting processing (step PS31) is performed, when the user operates the operation input unit 114M to input an instruction to proceed with the status-response setting, the main processor 101 creates the status-response setting screen 1000 shown in FIG. 10 in response to the instruction, and causes the display unit 114D to display the status-response setting screen 1000. The user inputs configuration information (i.e., settings) via the status-response setting screen 1000 (step PS32). Then, when the sleep mode transition time Ts set by the sleep mode setting processing (step PS11) is reached, the main processor 101 transfers the network configuration information (Ncfg) of FIG. 7 and the status-response configuration information (STinfo) of FIG. 11 to the sub processor 109 via the inter-processor communication control unit 107 as shown in FIG. 15, and causes the printer 100 to shift from the normal mode to the sleep mode. As a result, the main processor 101 is placed into the non-active state (step PS33).

The sub processor 109 initializes the protocol stack and the network I/F unit 108 using the network configuration information (Ncfg), and starts the E-mail reception processing.

First, as shown in FIG. 13, the sub processor 109 accesses the server device 300 (step S201). More specifically, the sub processor 109 establishes connection with the server device 300 using the network I/F unit 108, and sends a request RQT to the server device 300. The request RQT contains an inquiry command about the presence or absence of E-mail addressed to the printer 100 in the server device 300. In response to the request RQT from the sub processor 109, the server device 300 sends a response message RES indicating the presence or absence of E-mail (addressed to the printer 100) in the server device 300. Based on the response message RES from the server device 300, the sub processor 109 judges that the E-mail addressed to the own apparatus (i.e., the printer 100) is stored in the server device 300.

If no E-mail addressed to the printer 100 is stored in the server device 300 (NO in step S202), the sub processor 109 ends the status-response processing of FIG. 13. Thereafter, when the E-mail reception time interval ΔT is reached, the sub processor 109 repeats the status-response processing of FIG. 13. In this way, the sub processor 109 repeatedly sends the inquiry to the server device 300 (about the presence or absence of E-mail addressed to the printer 100) at the E-mail reception time interval ΔT during the sleep mode.

As shown in FIG. 15, when the server device 300 receives and stores an E-mail (STreq) addressed to the printer 100 sent from the PC 200, the sub processor 109 judges that the E-mail addressed to the printer 100 is stored in the server device 300 by performing the step S202 (YES in step S202 and step PS41 in FIG. 15). Then, the sub processor 109 accesses the server device 300 to acquire the E-mail (step S204 in FIG. 13). More specifically, the sub processor 109 establishes connection with the server device 300 via the network I/F unit 108, and sends an inquiry command about the presence or absence of E-mail in the server device 300, and acquires the E-mail list from the server device 300. According to the E-mail list, the sub processor 109 sends a reception request RQTm to the server device 300 to request the server device 300 to send the E-mail (addressed to the printer 100) to the printer 100. In response to the reception request RQTm, the server device 300 sends the designated E-mail (STreq) to the printer 100. As a result, the sub processor 109 receives the E-mail addressed to the printer 100 from the server device 300.

Next, the sub processor 109 analyzes a main body of the received E-mail (step S205 in FIG. 13), and judges whether the E-mail contains a description of a status request based on a result of analysis (step S206). If the received E-mail does not contain the description of the status request (NO in step S206), the sub processor 109 sets a printing—ON (step S209), and proceeds to a step S203B.

In contrast, if the received E-mail contains the description of the status request (YES in step S206 in FIG. 13, and step PS42 in FIG. 15), the sub processor 109 creates an E-mail (STinfo) containing a description of a status information (STinfo), and sends the E-mail to the PC 200 via the network I/F unit 108 (step S207 in FIG. 13), without activating the main processor 101. The server device 300 receives and stores the E-mail (STinfo).

Thereafter, the sub processor 109 deletes the E-mail (i.e., a status request mail) containing the description of the status request (step S208). More specifically, the sub processor 109 establishes connection with the server device 300 via the network I/F unit 108, sends an inquiry command to the server device 300 about the presence or absence of E-mail, and receives the E-mail list from the server device 300. According to the E-mail list, the sub processor 109 sends a deletion request RQTd to the server device 300 to request deletion of the status request mail. In response to the deletion request RQTd, the server device 300 deletes the designated status request mail (STreq) (step PS51 in FIG. 15). After the deletion of the status request mail is completed, the server device 300 returns a response message RES.

The sub processor 109 repeatedly performs steps S204 through S209 (between steps S203A and S203B) until sending of the status information to all of the status request mails listed in the E-mail list and deletion of all of the status request mails are completed. After the sending of the status information to all of the status request mails and the deletion of all of the status request mails are completed, the sub processor 109 judges whether the printing flag is ON or not (step S210). If the printing flag is not ON (NO in step S210), the status-response processing shown in FIG. 13 ends.

In contrast, if the printing flag is ON (YES in step S210), the sub processor 109 performs the E-mail-reception-and-printing processing shown in FIG. 14 (step S211). The E-mail-reception-and-printing processing (FIG. 14) is the same as the steps S103 through S105B (FIG. 8) of the E-mail-reception-and-printing processing described in Embodiment 1. After the printing according to the attachment file attached to the received E-mail is completed, the main processor 101 returns to the main routine shown in FIG. 13, and the status-response processing shown in FIG. 13 ends.

The PC 200 can accesses the server device 300 to acquire the response mail (E-mail (STinfo)) containing the status information stored in the server device 300. The user can recognize the current status of the printer 100 based on a content of the response mail. Based on the current status of the printer 100, the user can determine, for example, whether to send a print job to the printer 100.

As described above, the printer 100 of Embodiment 2 is able to send the response mail (E-mail (STinfo)) containing the status information in the sleep mode, and therefore the status-response processing can be performed with low power consumption.

Embodiment 3

Figure 16:
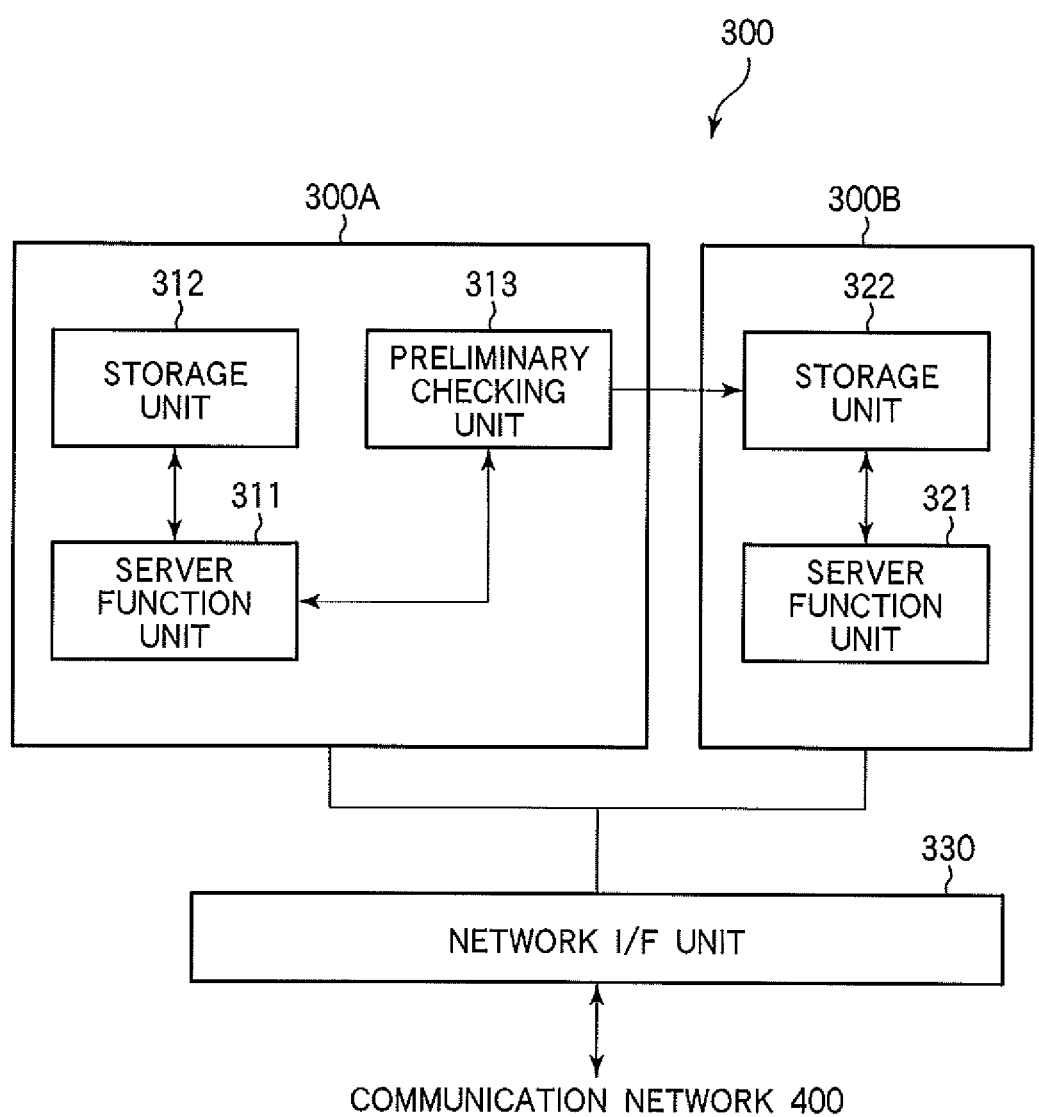
FIG. 16 is a function block diagram schematically showing a server device according to Embodiment 3 of the present invention.

Next, Embodiment 3 of the present invention will be described. An image forming system of Embodiment 3 includes the printer 100 described in Embodiment 1 and a server device 300 constituted as shown in FIG. 16. As shown in FIG. 16, the server device 300 of Embodiment 3 includes mail servers 300A and 300B that cooperate with each other, and a network I/F (interface) unit 330. The mail servers 300A and 300B are connected to the communication network 400 via the network I/F unit 300.

The mail server 300A includes a server function unit 311 for sending and receiving E-mails, and a storage unit 312 for storing E-mails received from a client terminal such as the PC 200. Similarly, the mail server 300B includes a server function unit 321 for sending and receiving E-mails, and a storage unit 322 for storing E-mails received from the client terminal.

The server function unit 311 of the mail server 300A has an encrypted communication function to communicate with the client terminal (such as the PC 200) and the printer 100 using an encrypted communication protocol such as SSL/TLS or S/MIME. In this embodiment, the mail server 300A communicates with the PC 200 and the printer 100 using the encrypted communication function. In contrast, the mail server 300E communicates with the PC 200 and the printer 100 using a plain text.

The mail server 300A includes a preliminary checking unit 313. The preliminary checking unit 313 has a function to check whether an attachment file attached to the E-mail received by the server function unit 311 has a format (i.e., a printable format) in which the printer 100 can form an image on the recording medium. If the preliminary checking unit 313 determines that the attachment file of the received E-mail has the format in which the printer 100 can form an image, the preliminary checking unit 313 creates an E-mail (i.e., print instruction mail) containing a description of a print instruction associated with a message header of the received E-mail, and stores the print instruction mail in the storage unit 322 of the mail server 300B. The server function unit 321 of the mail server 300B sends a list of information indicating presence or absence of the print instruction mail and data of the print instruction mail to the client terminal (for example, the printer 100) in response to a request from the client terminal.

Function blocks forming the mail servers 300A and 300B can be incorporated in a single physical or virtual computer, or can be realized using a plurality of distributed physical or virtual computers.

The printer 100 has a function to perform an E-mail-reception-and-printing processing using the above described mail servers 300A and 300B. The E-mail-reception-and-printing processing of Embodiment 3 will be herein described.

Figure 17:
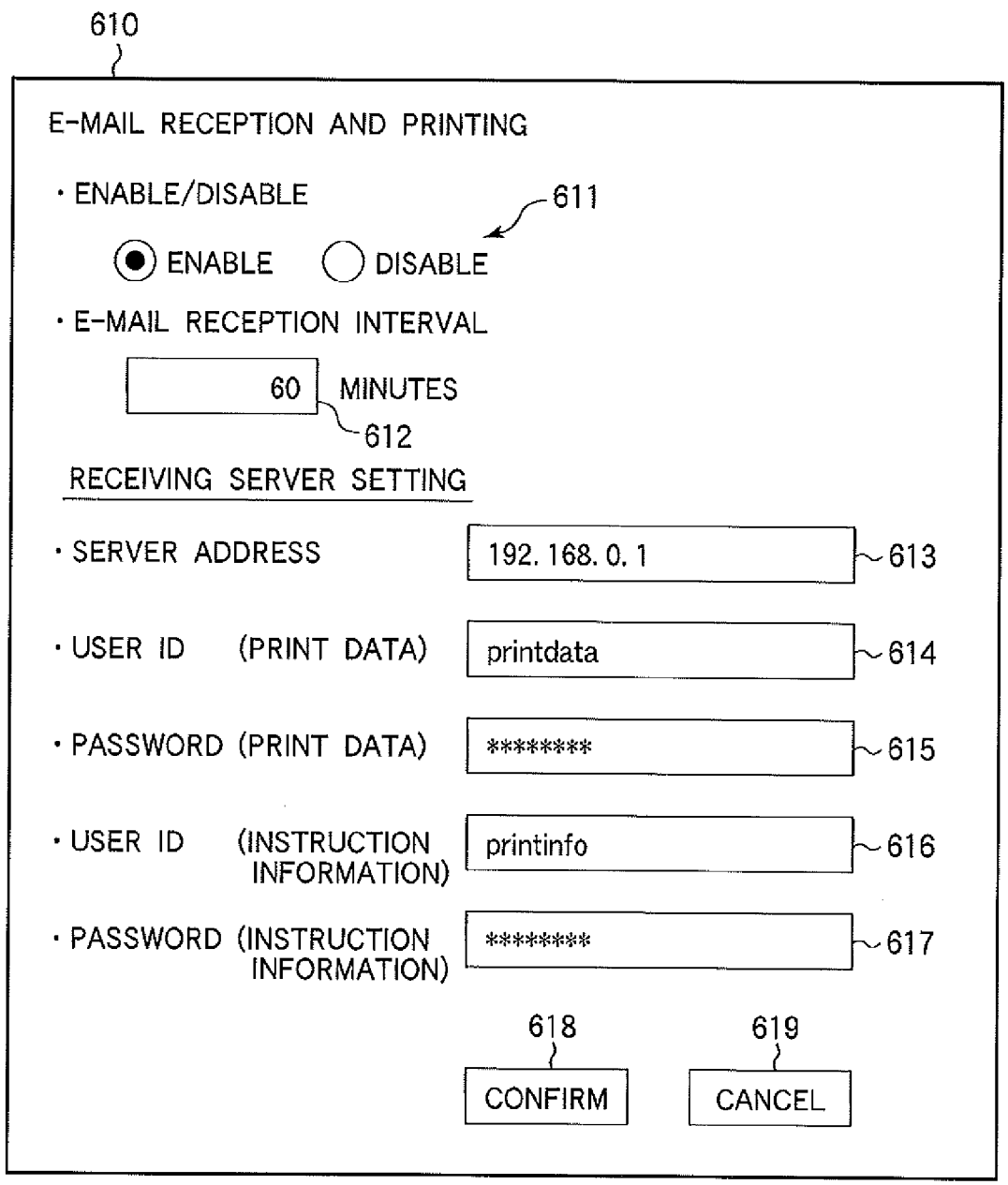
FIG. 17 shows an example of an E-mail-reception-and-printing setting screen according to Embodiment 3.

FIG. 17 shows an example of the E-mail-reception-and-printing setting screen 610 displayed by the display unit 114. The main processor 101 performs the E-mail-reception-and-printing setting processing, and causes the display unit 114D to display the E-mail-reception-and-printing setting screen 610. The E-mail-reception-and-printing setting screen 610 includes a radio button 601 for selecting between enabling ("enable") and disabling ("disable") of an E-mail-reception-and-printing function, an input box 612 for setting a time interval of reception of E-mails (i.e., a time interval for inquiry about the presence or absence of E-mail) by minutes, an input box 613 for setting a network address (i.e., a mail server address) of the server device 300 (i.e., a mail server), an input box 614 for setting a user identifier (i.e., a user ID) registered in the mail server 300A, an input box 615 for setting a certification password registered in the mail server 300A, an input box 616 for setting a user identifier (i.e., a user ID) registered in the mail server 300B, and an input box 617 for setting a certification password registered in the mail server 300B. Further, the E-mail-reception-and-printing setting screen 610 includes a confirmation button 618 for confirming inputted settings and for storing the settings in the nonvolatile memory 101M, and a cancel button 619 for cancelling (stopping) the E-mail-reception-and-printing setting processing.

Figure 18:
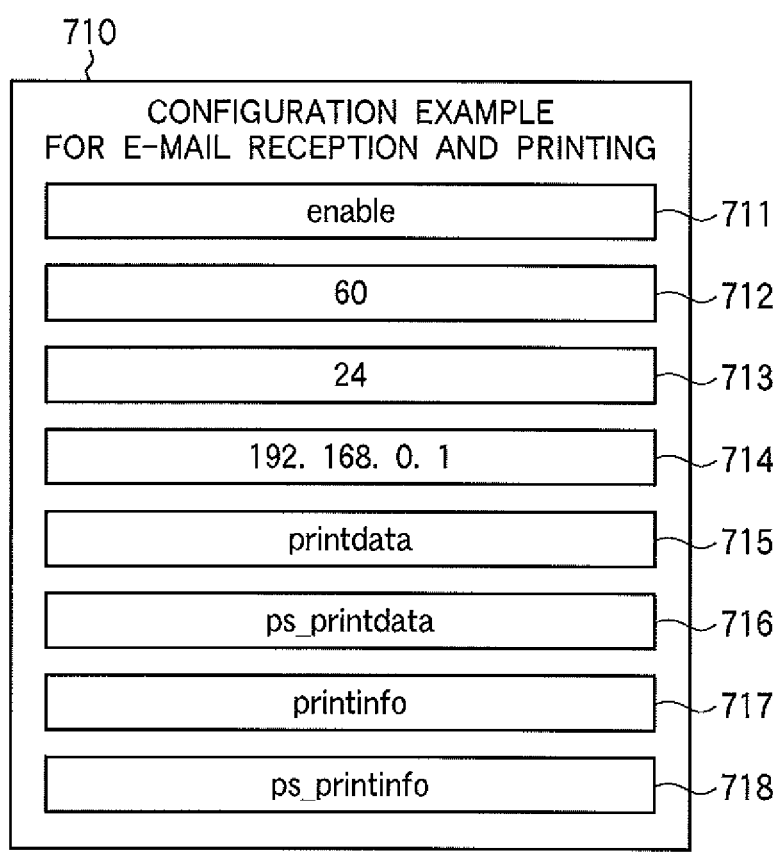
FIG. 18 shows an example of information set using the E-mail-reception-and-printing setting screen shown in FIG. 17.

The user can enable a function of the E-mail-reception-and-printing processing (described later) by operating the operation input unit 114M to select the radio button 611 "enable" of the E-mail-reception-and-printing setting screen 610 and to press the confirmation button 618 and by inputting settings in the input boxes 612 through 617. In contrast, the user can disable the function of the E-mail-reception-and-printing processing by operating the operation input unit 114M to select the radio button 611 "disable" of the E-mail-reception-and-printing setting screen 610 and to press the confirmation button 618. attache FIG. 18 shows an example of a data structure of configuration information 710 set using the E-mail-reception-and-printing setting screen 610 of FIG. 17. As shown in FIG. 18, the configuration information 710 includes a value 711 indicating "enable" or "disable", a mail server address 712, a remaining time 713 (minutes) before sending next inquiry command to the mail server 300B about the presence or absence of E-mail, a network address (i.e., a mail server address) 714, a user ID 715 used when sending the inquiry to the mail sever 300A about the presence or absence of E-mail, a certification password 716, a user ID 717 used when sending the inquiry to the mail sever 300B about the presence or absence of E-mail, and a certification password 718, which are set using the E-mail-reception-and-printing setting screen 610 (FIG. 17). In the configuration information 710 shown in FIG. 18, the value 711 is set to a value indicating "enable".

As described in Embodiment 1, the main processor 101 has a function to store the configuration information of the sleep mode setting screen 500 (FIG. 4) in the nonvolatile memory 101M and utilize the configuration information, and has a function to store the network configuration information 800 (FIG. 7) in the nonvolatile memory 101M and utilize the network configuration information.

Figure 19:
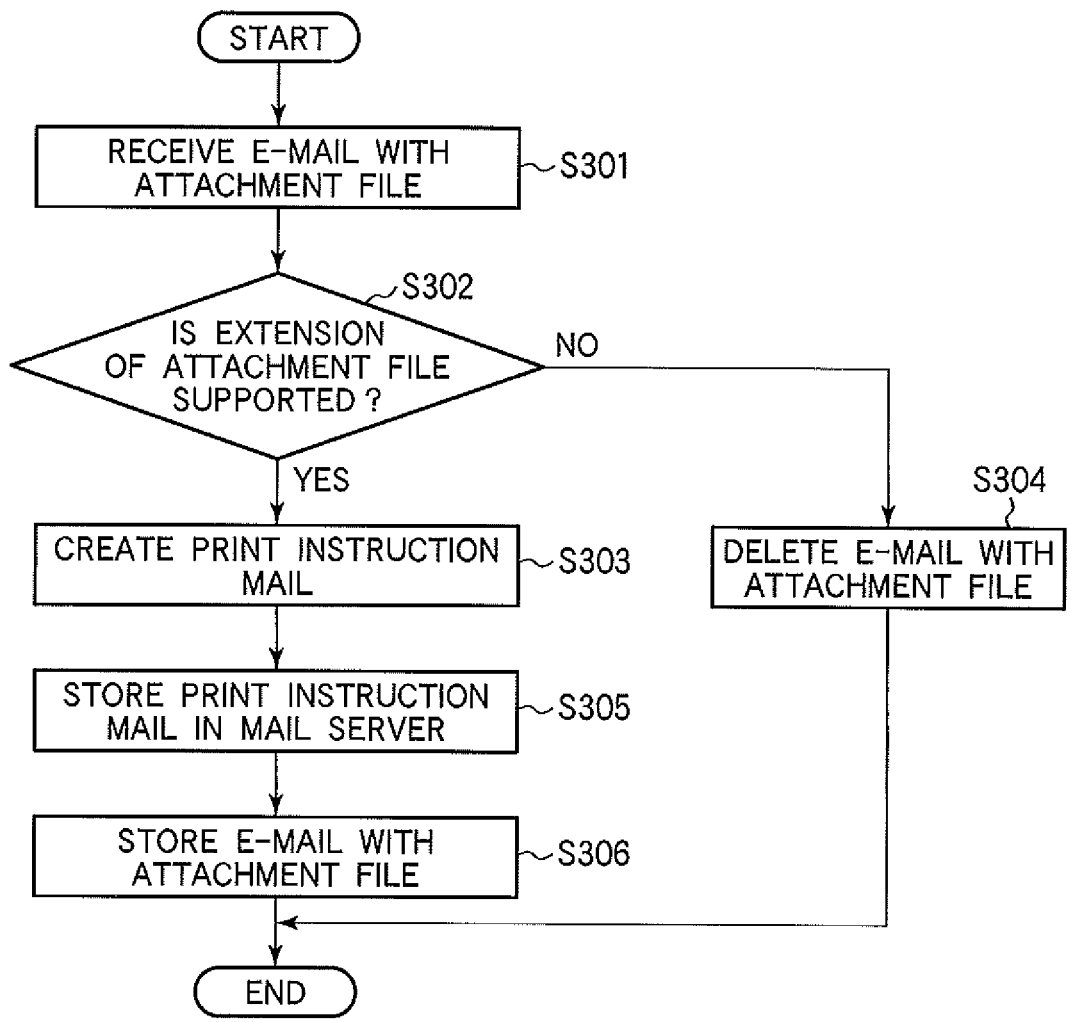
FIG. 19 is a flow chart schematically showing a preliminary checking processing by a mail server of the server device according to Embodiment 3.
Figure 20:
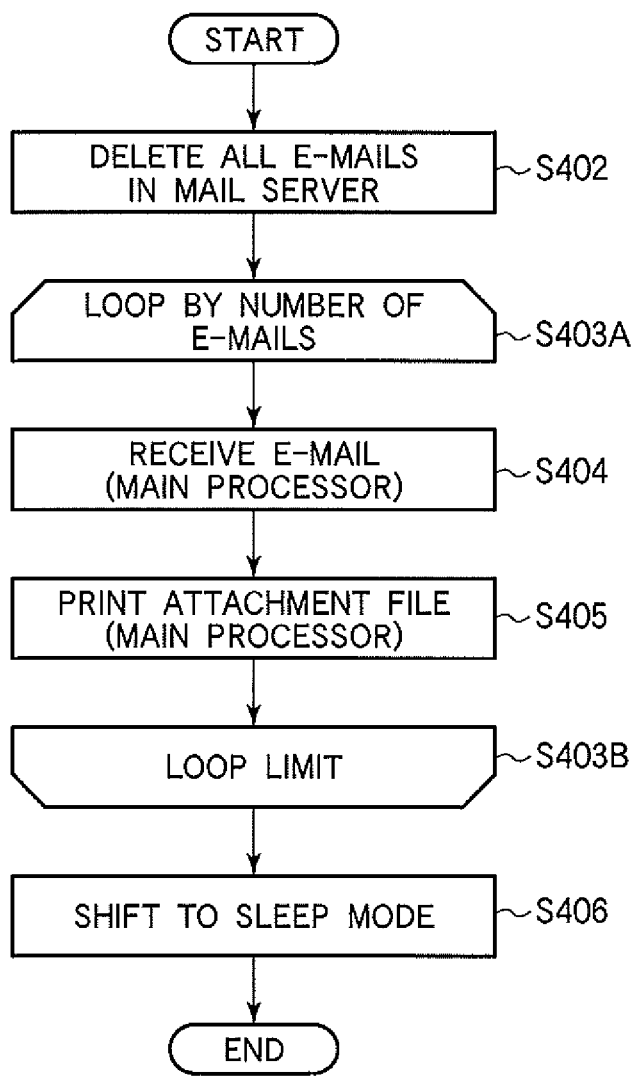
FIG. 20 is a flow chart schematically showing a sleep mode transition processing of a printer.

Next, processing of Embodiment 3 will be described with reference to FIGS. 19 through 21. FIG. 19 is a flow chart schematically showing a preliminary checking processing performed by the mail server 300A of the server device 300. FIG. 20 is a flow chart schematically showing a sleep mode transition processing of the printer 100 performed by the main processor 101. FIG. 21 shows an example of a processing sequence of the image forming system 1 according to Embodiment 3.

The user can send an E-mail with an attached file having a printable format to the printer 100 using the E-mail sending client function and the encrypted communication function of the PC 200. As shown in FIG. 21, when the server function unit 311 of the mail server 300A receives an E-mail (PRT) via the network I/F unit 330 (step S301 in FIG. 19), the preliminary checking unit 313 judges whether a extension of the attachment file attached to the E-mail is supported by the printer 100 (step S302 in FIG. 19). FIG. 22 shows an example of a content of the E-mail 1300 with the attachment file. In this example, the attachment file attached to the E-mail is encoded using MIME (Multipurpose Internet Mail Extension) as specified in RFC.

When the preliminarily checking unit 313 judges that the extension of the attachment file is supported by the printer 100 (YES in S302 in FIG. 19), the preliminary checking unit 313 determines that the attachment file has a format in which the printer 100 can print an image on the recording medium. Then, the preliminary checking unit 313 creates a print instruction mail (E-mail (Pinst)) (step S303 in FIG. 19 and PS91 in FIG. 21), and stores the print instruction mail in the storage unit 322 of the mail server 300B (step S305). FIG. 23 shows an example of a content of a print instruction mail. In this example, a header of the print instruction mail 1301 contains a description "Subject: ORDER", and a main body of the print instruction mail 1301 contains a description "ORDER: PRINT" indicating the print instruction. Then, the server function unit 311 of the mail server 300A stores a data of the E-mail (PRT) in the storage unit 312 (step S306).

In contrast, when the preliminarily checking unit 313 judges that the extension of the attachment file is not supported by the printer 100 (NO in S302 in FIG. 19), the server function unit 311 of the mail server 300A deletes the E-mail with the attachment file (step S304), and the preliminary checking processing shown in FIG. 19 ends.

Next, the sleep mode transition processing of the printer 100 by the main processer 101 will be described with reference to a flow chart shown in FIG. 20.

After the printer 100 is turned on, the printer 100 operates in the normal mode. When the user operates the operation input unit 114M to input an instruction to proceed with the sleep mode setting, the main processor 101 creates the sleep mode setting screen 500 (FIG. 4) in response to the instruction, and causes the display unit 114D to display the sleep mode setting screen 500. The user inputs configuration information (i.e., settings) via the sleep mode setting screen 500 (step PS61 in FIG. 21). Next, when the user operates the operation input unit 114M to input an instruction to proceed with the E-mail-reception-and-printing setting, the main processor 101 creates the E-mail-reception-and-printing setting screen 610 (FIG. 17) in response to the instruction, and causes the display unit 114D to display the E-mail-reception-and-printing setting screen 610. The user inputs configuration information (i.e., settings) via the E-mail-reception-and-printing setting screen 610 (step PS62 in FIG. 21). Then, when the sleep mode transition time Ts set by the sleep mode setting processing (step PS61 in FIG. 21) is reached, the main processor 101 proceeds to the sleeping mode transition processing shown in FIG. 20.

The main processor 101 accesses the mail server 300B, and deletes all of the print instruction mails stored in the mail server 300B (step S402). More specifically, the main processor 101 establishes connection with the mail server 300B via the network I/F unit 108, sends an inquiry command to the mail server 300B about the presence or absence of E-mail, and receives the E-mail list in a plain text. According to the E-mail list, the main processor 101 sends a deletion request RQTd to the mail server 300B to request deletion of the print instruction mail. In response to the deletion request RQTd, the mail server 300B deletes the designated print instruction mail (E-mail (Pinst)) from the storage unit 322 (step PS81 in FIG. 21). After the deletion is completed, the mail server 300B returns the response message RES.

Next, the main processor 101 receives an E-mail from the mail server 300A (step S404 in FIG. 20). More specifically, the main processor 101 establishes connection with the mail server 300A via the network I/F unit 108 using the encrypted communication, sends an inquiry command to the mail server 300A about the presence or absence of E-mail, and receives the E-mail list from the mail server 300A. According to the E-mail list, the main processor 101 sends a reception request RQTm to the mail server 300A to request the mail server 300A to send the E-mail (addressed to the printer 100) to the printer 100. In response to the reception request RQTm, the mail server 300A sends the designated E-mail (PRT) to the printer 100. As a result, the main processor 101 receives the E-mail addressed to the printer 100 from the mail server 300A (step S404 in FIG. 20).

Next, the main processor 101 performs printing according to the attachment file attached to the received E-mail (step S405 in FIG. 20). More specifically, the main processor 101 causes the image processing unit 104 to create a printing image data from the attachment file attached to the received E-mail. Then, the main processor 101 sends a print command to the sub processor 109 via the inter-processor communication unit 107. In response to the print command, the sub processor 109 controls the image forming unit 105 to form (print) the printing image data on the recording medium (step PS71 in FIG. 21). After the formation of the image is completed, the sub processor 109 sends a completion notice to the main processor 101 via the inter-processor communication unit 107.

The main processor 101 repeatedly performs steps S404 and S405 (between steps S403A and S403B) in FIG. 20 until all of the E-mails listed in the E-mail list are received and corresponding images are formed on the recording medium. After the printing of the images corresponding to all of the E-mails listed in the E-mail list is completed, the main processor 101 proceeds to a step S406.

In the step S406, as shown in FIG. 21, the main processor 101 transfers the network configuration information (Ncfg) of FIG. 7 to the sub processor 109 via the inter-processor communication unit 107, and causes the printer 100 to shift from the normal mode to the sleep mode. As a result, the main processor 101 is placed in the non-active state (step PS63 in FIG. 21), and the sleep mode transition processing shown in FIG. 20 ends. During the sleep mode thereafter, the sub processor 109 repeatedly sends the inquiry to the mail server 300B about the presence or absence of E-mail addressed to the printer 100 at the time interval ΔT.

Figure 24:
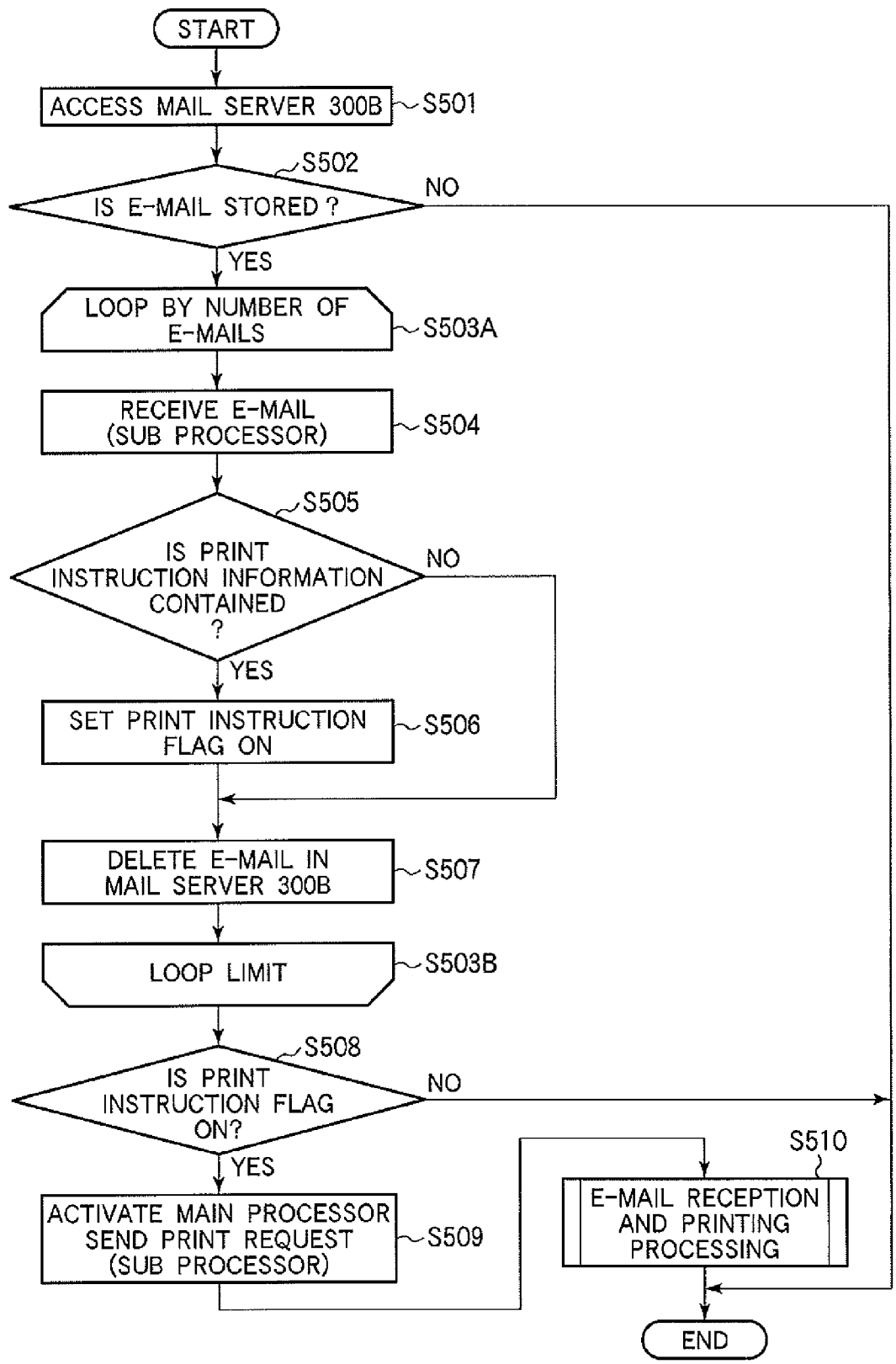
FIG. 24 is a flow chart schematically showing a main routine of a procedure performed by a printer according to Embodiment 3.
Figure 25:
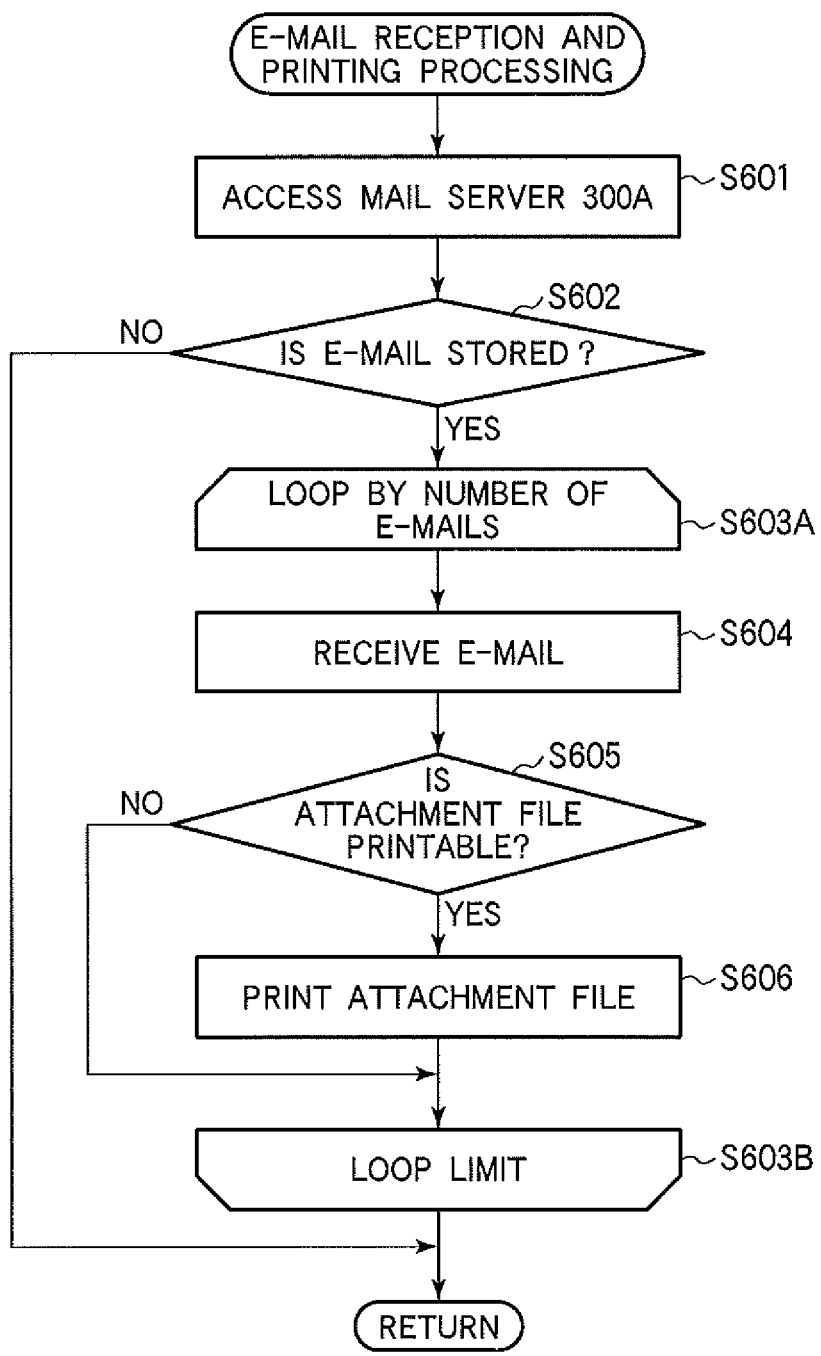
FIG. 25 is a flow chart schematically showing a sub-routine of the procedure performed by the printer according to Embodiment 3.
Figure 26:
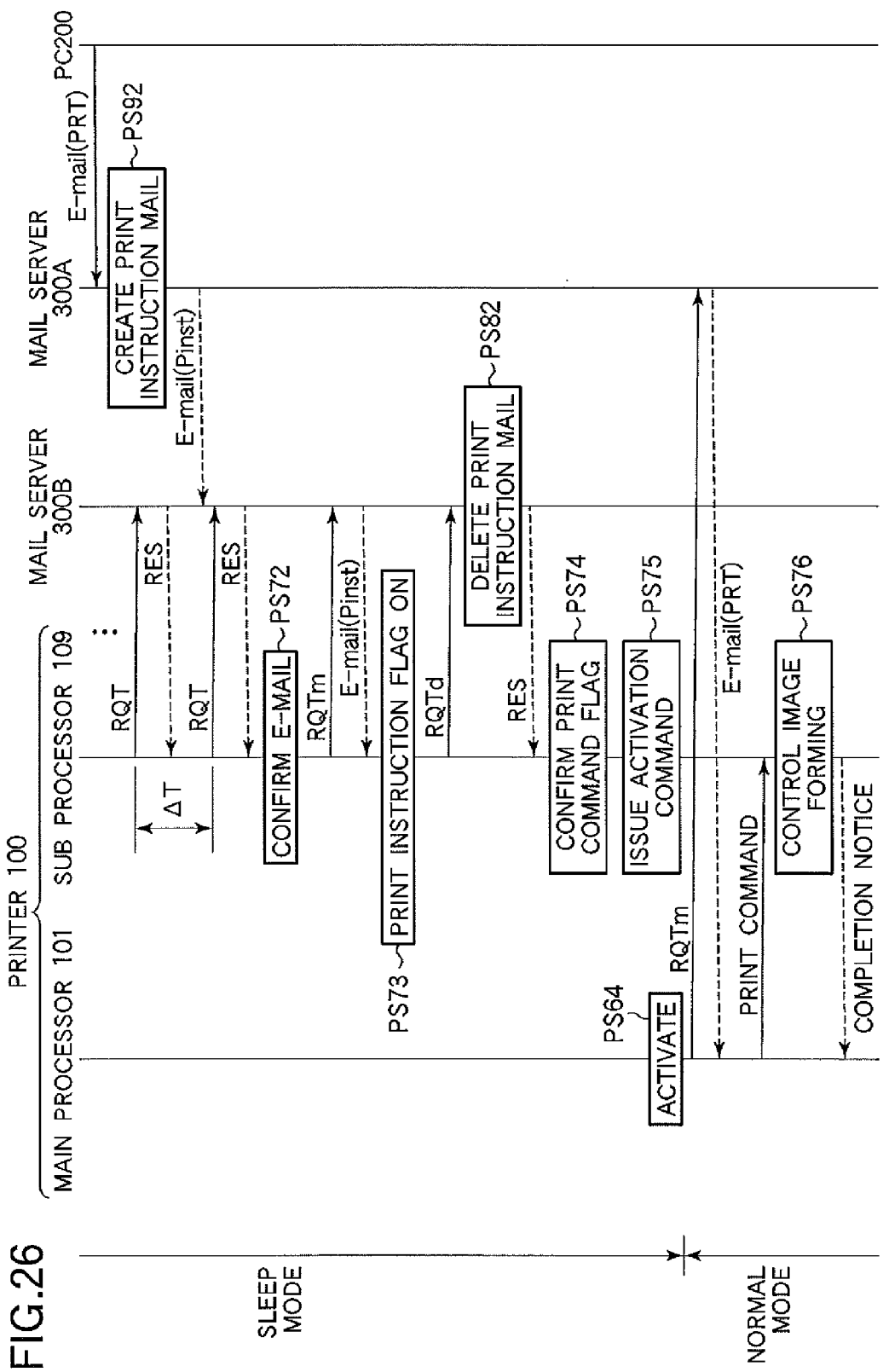
FIG. 26 shows another example of the processing sequence of the image forming system according to Embodiment 3.

Next, an operation of the image forming system 1 after the printer 100 shifts to the sleep mode will be described with reference to FIGS. 24, 25 and 26. FIGS. 24 and 25 are flow charts schematically showing a processing sequence of the printer 100 of Embodiment 3. FIG. 26 is a flow chart schematically showing a processing sequence of the image forming system 1 of Embodiment 3. After the printer 100 shifts to the sleep mode, the sub processor 109 repeatedly performs the processing shown in FIG. 24.

First, the sub processor 109 accesses the mail server 300B, and sends an inquiry to the mail server 300B about the presence or absence of E-mail addressed to the printer 100 (step S501). More specifically, the sub processor 109 establishes connection with the mail server 300B via the network I/F unit 108. Then, the sub processor 109 sends a request RQT to the mail server 300B, which containing an inquiry command to the mail server 300B about the presence or absence of E-mail addressed to the printer 100. In response to the request RQT from the sub processor 109, the mail server 300B sends a response message RES to the sub processor 109, which indicates the presence or absence of E-mail (addressed to the printer 100) in the mail server 300B. Based on the response message RES from the mail server 300B, the sub processor 109 judges the presence or absence of E-mail (addressed to the printer 100) in the mail server 300E (step S502 in FIG. 24).

When the mail server 300A creates a print instruction mail (E-mail (Pinst)) addressed to the printer 100 (step PS92 in FIG. 26), and stores the print instruction mail in the mail server 300B, the sub processor 109 judges the presence or absence of E-mail (addressed to the printer 100) in the mail server 300B by performing the step S502 (YES in step S502, step PS72 in FIG. 26). Then, the sub processor 109 accesses the E-mail server 300B and receives the E-mail (step S504 in FIG. 24). More specifically, the sub processor 109 establishes connection with the mail server 300B via the network I/F unit 108, and sends an inquiry command to the mail server 300B about the presence or absence of E-mail addressed to the printer 100, and receives the E-mail list from the mail server 300B. According to the E-mail list, the sub processor 109 sends a reception request RQTm to the mail server 300B to request the mail server 300B to send the E-mail (addressed to the printer 100) to the printer 100 as shown in FIG. 26. In response to the reception request RQTm from the sub processor 109, the mail server 300B sends the designated E-mail (Pinst) to the printer 100. As a result, the sub processor 109 receives the E-mail addressed to the printer 100.

Then, the sub processor 109 judges whether a description of the received E-mail contains print instruction information (step S505 in FIG. 24). If the received E-mail does not contain the print instruction information (NO in step S505), the sub processor 109 proceeds to a step S507. If the received E-mail contains the print instruction information (YES in step S505), the sub processor 109 sets a printing command flag ON (step S506 in FIG. 24 and step PS73 in FIG. 26), and proceeds to the step S507.

In the step S507, the sub processor 109 deletes the E-mail. More specifically, the sub processor 109 establishes connection with the mail server 300B via the network I/F unit 108, and sends an inquiry command to the mail server 300B about the presence or absence of E-mail addressed to the printer 100, and receives the E-mail list from the mail server 300B. According to the E-mail list, the sub processor 109 sends a deletion request RQTd to the mail server 300B to request deletion of the E-mail as shown in FIG. 26. In response to the deletion request RQTd, the mail server 300B deletes the designated E-mail (step PS82 in FIG. 26). After the deletion of the E-mail is completed, the mail server 300B returns a response message RES.

The sub processor 109 repeatedly performs steps S504 through S507 (between steps S503A and S503B) until the deletion of all of the E-mails listed in the E-mail list is completed. After the deletion of all of the status request mails is completed, the sub processor 109 proceeds to a step S508.

In the step S508, the sub processor 109 judges whether the print instruction flag is ON. If the print instruction flag is not ON (NO in step S508), the processing shown in FIG. 24 ends. If the print instruction flag is ON (YES in step S508), the sub processor 109 sends an activation command to the power control unit 106 to activate the main processor 101 (step S509 and step PS74, PS75 and PS64 in FIG. 26). More specifically, in response to the activation command from the sub processor 109, the power control unit 106 restarts power supply to the main function unit 100A including the main processor 101 so as to activate the main processor 101. Then, the sub processor 109 sends the print request command to the main processor 101 via the inter-processor communication control unit 107 (step S509 in FIG. 24). The sub processor 109 retrieves control commands for the normal mode from the first program storage unit 112, and performs the control commands.

The main processor 101 (placed in the active state) performs an E-mail-reception-and-printing processing shown in FIG. 25 (step S510). That is, in response to the print request command from the sub processor 109, the main processor 101 initializes the protocol stack and the network I/F unit 108 using the network configuration information (Nchg), and accesses the mail server 300A (step S601 in FIG. 25). More specifically, the main processor 101 establishes connection with the mail server 300A via the network I/F unit 108 using the encrypted communication function, and sends the inquiry command to the mail sever 300A about the presence or absence of E-mail addressed to the printer 100 in the mail server 300A, and acquires the E-mail list from the mail server 300A. According to the E-mail list, the main processor 101 sends a reception request RQTm to the mail server 300A to request the mail server 300A to send the E-mail (addressed to the printer 100) to the printer 100. In response to the reception request RQTm, the mail server 300A sends the designated E-mail to the printer 100. As a result, the main processor 101 receives the E-mail addressed to the printer 100 from the mail server 300A (step S604 in FIG. 25).

Then, the main processor 101 judges whether the attachment file attached to the E-mail has a format (i.e., a printable format) in which the printer 100 can form (print) an image on the recording medium (step S605). If the attachment file has the printable format (YES in step S605), the main processor 101 performs printing of the attachment file (step S606). More specifically, the main processor 101 creates a printing image data from the attachment file attached to the received E-mail using the image processing unit 104. Then, the main processor 101 sends a print command to the sub processor 109 via the inter-processor communication control unit 107. In response to the print command from the main processor 101, the sub processor 109 controls an operation of the image forming unit 105 to form (print) an image on the recording medium based on the printing image data (step PS76 in FIG. 26). When the image formation is completed, the sub processor 109 sends a completion notice to the main processor 101 via the inter-processor communication control unit 107.

The main processor 101 repeatedly performs steps S604 through S606 (between steps S603A and S603B) in FIG. 25 until all of the E-mails listed in the E-mail list are received and corresponding images are formed on the recording medium. After the printing of the images corresponding to all of the E-mails listed in the E-mail list is completed, the main processor 101 returns to the main routine of FIG. 24, and the E-mail-reception-and-printing processing shown in FIG. 24 ends.

As described above, the server device 300 of Embodiment 3 has the preliminary checking unit 313. The preliminary checking unit 313 checks whether the attachment file of the E-mail has the format (i.e., printable format) in which the printer 100 can form an image on a recording medium. If the attachment file has the printable format, the preliminary checking unit 313 creates and stores the print instruction mail in the mail server 300B. The sub processor 109 send the inquiry to the mail server 300B about the presence or absence of the print instruction mail, and activates the main processor 101 only when the print instruction mail is stored in the mail server 300B (S508 in FIG. 24). The main processor 101 acquires the E-mail from the mail server 300A (S509), and causes the image forming unit 105 to form an image according to the attachment file of the E-mail (S510). Therefore, if the attachment file attached to the E-mail stored in the mail server 300A does not have the printable format, the main processor 101 is not activated. Thus, the image formation (printing) using the E-mail system can be performed with lower power consumption as compared with Embodiment 1.

Further, the main processor 101 deletes all of the print instruction mails stored in the mail server 300B, and acquires the E-mail from the mail server 300A to form the image on the recording medium according to the attachment file of the E-mail, just before the printer 100 shifts from the normal mode to the sleep mode. Therefore, it becomes possible to prevent the main processor 101 from being activated soon after the printer 100 shifts to the sleep mode.

Furthermore, the sub processor 109 and the mail server 300B communicate with each other using a plain text, and therefore a processing load on the sub processor 109 is small, with the result that power consumption of the printer 100 in the sleep mode can be reduced. In this regard, it is preferable to set an operation clock of the sub processor 109 to be lower in the sleep mode than in the normal mode, so as to further reduce power consumption of the printer 100 in the sleep mode.

Embodiment 4

Next, Embodiment 4 of the present invention will be described. An image forming apparatus according to Embodiment 4 includes the printer 100, the mail server 300A and the mail server 300B described in Embodiment 3. In Embodiment 4, the printer 100 has the functions described in Embodiment 3, and also has a status-response function to send status information indicating a current status (such as current operating conditions or settings) of the printer 100 (i.e., the own apparatus), in response to a request from a client terminal (for example, the PC 200) of the E-mail system. Hereinafter, the status-response function according to Embodiment 4 will be described.

FIG. 27 shows an example of an E-mail-reception-and-printing setting screen 1400 displayed by the display unit 114D. The main processor 101 performs an E-mail-reception-and-printing setting processing of Embodiment 4 and causes the display unit 114D to display the E-mail-reception-and-printing setting screen 1400. The E-mail-reception-and-printing setting screen 1400 includes setting items 611 through 617, 618 and 619 which are the same as those of the E-mail-reception-and-printing setting screen 610 of FIG. 17, and an input box 1401 for setting a server address for sending E-mails.

Figure 28:
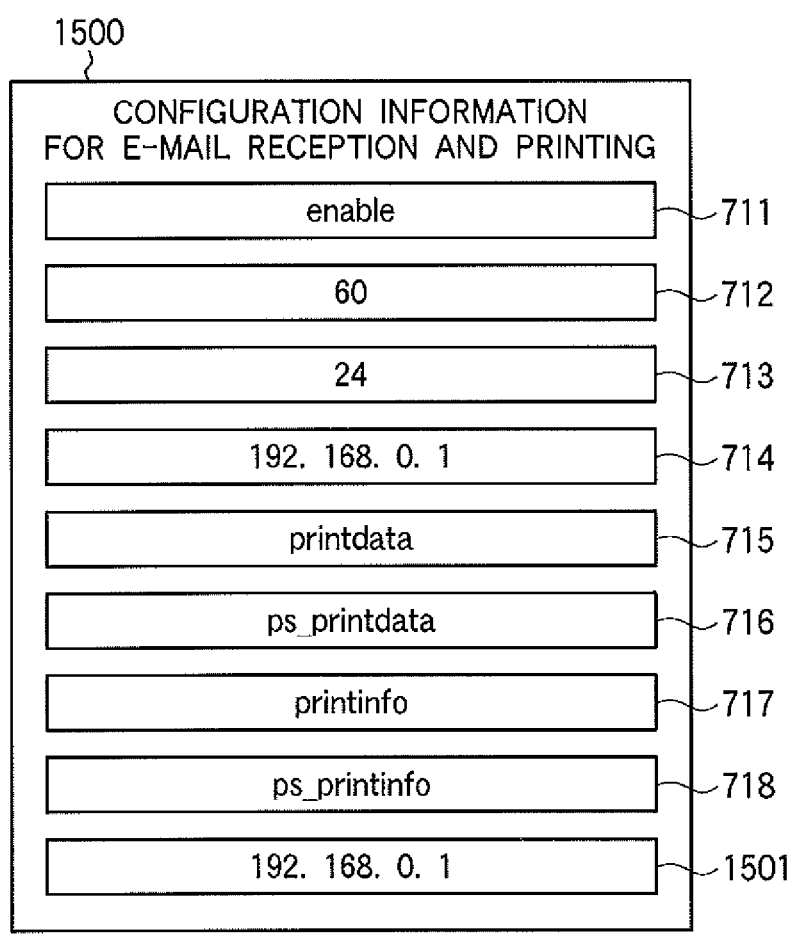
FIG. 28 shows an example of configuration information set using the E-mail-reception-and-printing setting screen shown in FIG. 27.

FIG. 28 shows an example of configuration information 1500 set using the E-mail-reception-and-printing setting screen 1400 shown in FIG. 27. As shown in FIG. 28, the configuration information 1500 includes a value 711 indicating "enable" or "disable", a time interval 712 of reception of E-mails, a remaining time 713 (minutes) before sending next inquiry command, and a mail server address 714, and further includes a user ID 715 and a certification password 716 used when sending the inquiry to the mail sever 300A, a user ID 717 and a certification password 718 used when sending the inquiry to the mail sever 300B, as in the configuration information 710 of FIG. 18. Further, the configuration information 1500 includes a server address 1501 for sending E-mails inputted in the input box 1401 of FIG. 27.

The main processor 101 transfers the network configuration information (Ncfg) of FIG. 7 and the server address 1501 (for sending E-mails) to the sub processor 109 via the inter-processor communication control unit 107, and then causes the printer 100 to shift from the normal mode to the sleep mode.

As described in Embodiment 1, the main processor 101 has a function to store the configuration information (set via the sleep mode setting screen 500 of FIG. 4) in the nonvolatile memory 101M and utilize the configuration information, and has a function to store the network configuration information 800 (FIG. 7) in the nonvolatile memory 101M and utilize the network configuration information.

Figure 29:
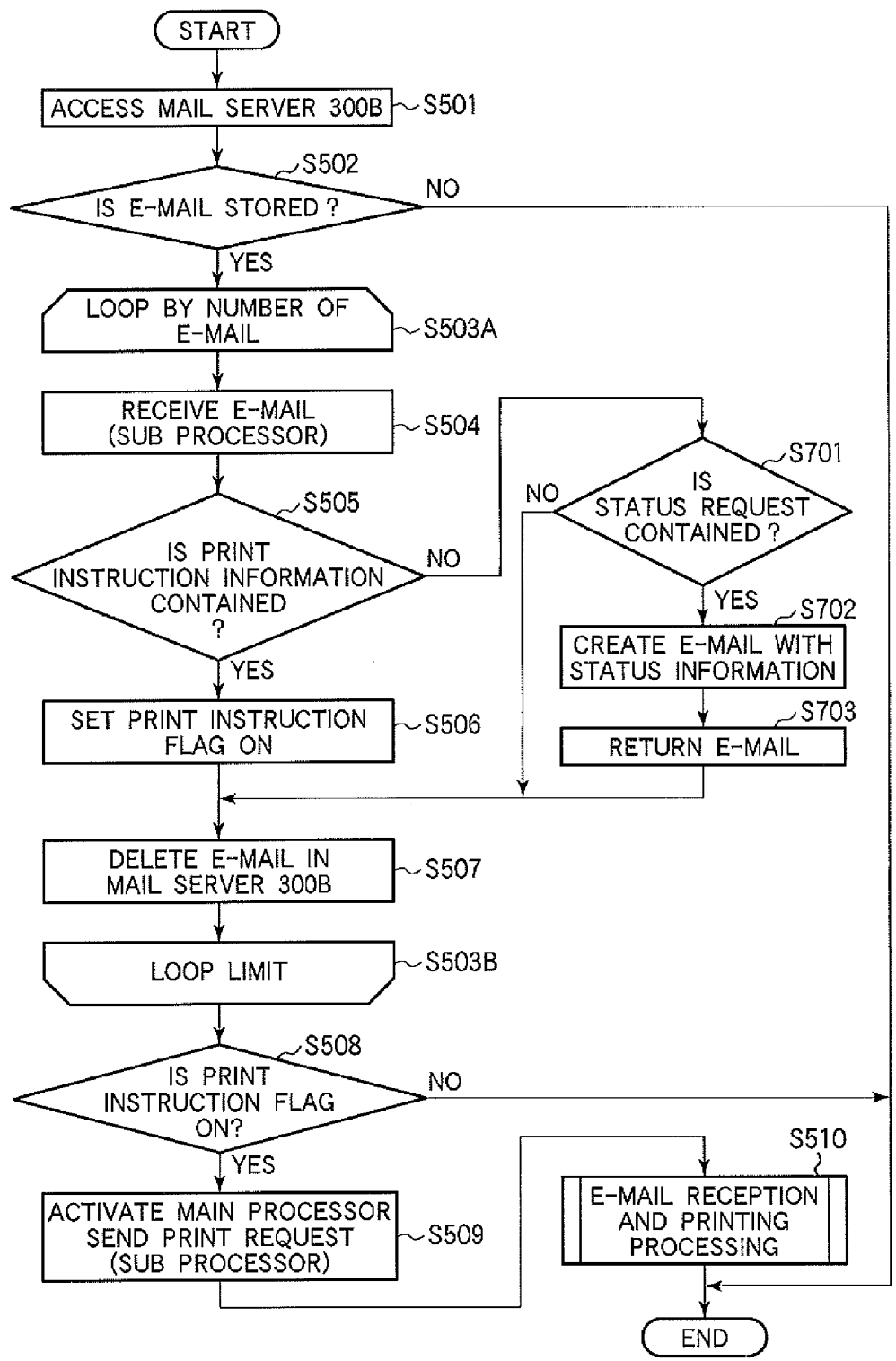
FIG. 29 is a flow chart schematically showing a procedure performed by the printer according to Embodiment 4.
Figure 30:
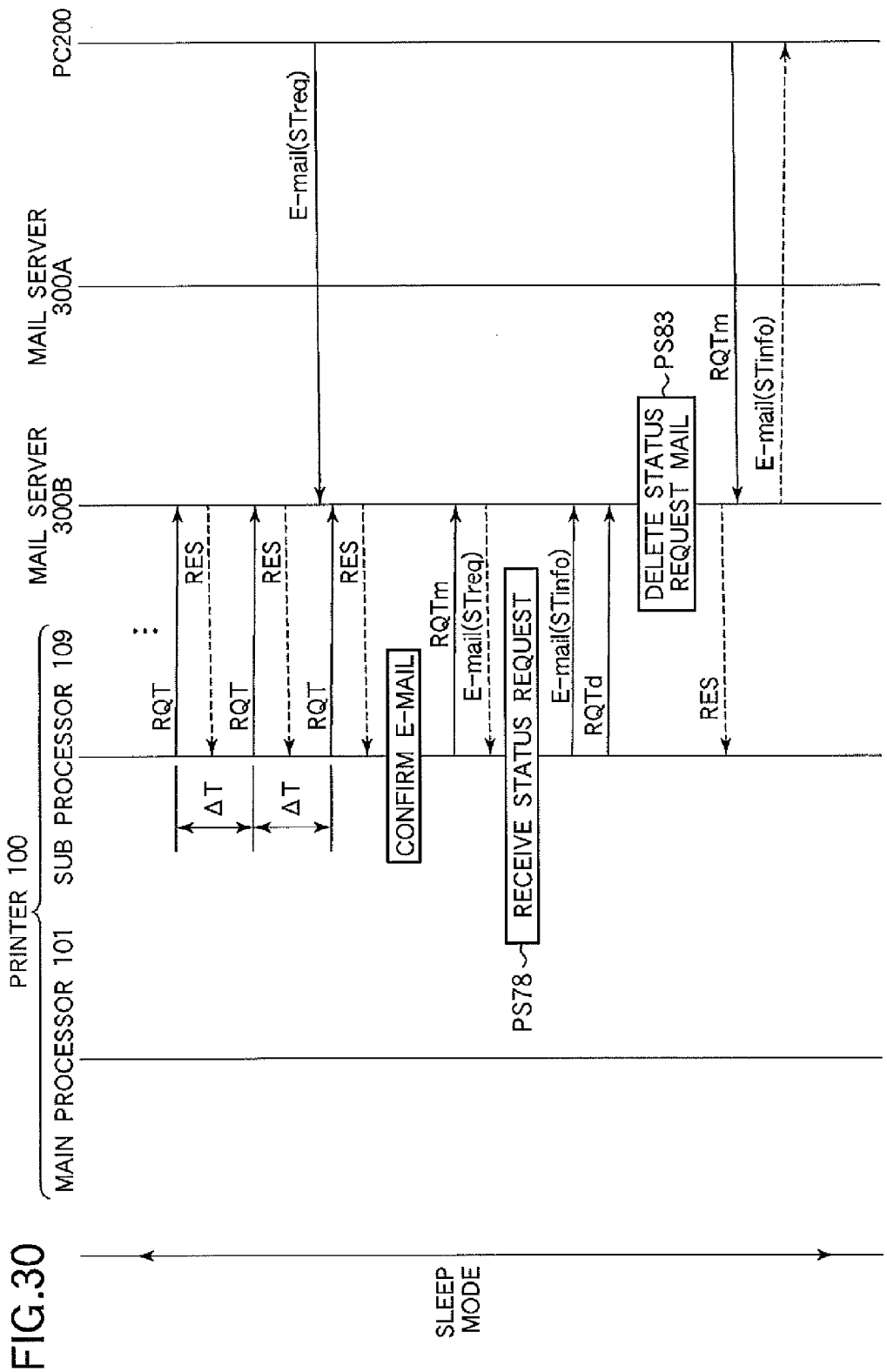
FIG. 30 is a schematic view showing a processing sequence of the image forming system in the sleep mode according to Embodiment 4.

Next, an operation of the image forming system 1 according to Embodiment 4 will be described with reference to FIGS. 29 and 30. FIG. 29 is a flow chart for schematically illustrating a procedure performed by the printer 100 of Embodiment 4. The procedure performed by the printer 100 shown in FIG. 29 is the same as that of the flow chart of FIG. 24 except the steps S701 through S703. FIG. 30 shows an example of a processing sequence of the image forming system 1 according to Embodiment 4 in the sleep mode.

As in Embodiment 3, the sub processor 109 accesses the mail server 300B and send the inquiry to the mail server 300B about the presence or absence of E-mail addressed to the printer 100 (step S501), and performs steps S504 and S505. If it is determined that a description of the received E-mail contains print command information in the step S505 (YES in step S505), similar processing is performed as in Embodiment 3.

In contrast, if it is determined that the description of the received E-mail does not contain print command information in the step S505 (NO in step S505), the sub processor 109 analyzes a content of the received E-mail, and judges whether the received E-mail contains a description of the status request based on a result of the analysis (step S701). If the received E-mail does not contain the description of the status request (NO in step S701), the sub processor 109 proceeds to the step S507.

In the received E-mail is an E-mail containing the description of the status request (STreq) (YES in step S701, step PS78 in FIG. 30), the sub processor 109 creates an E-mail containing the description of the status information (STinfo) (step S702) and sends the E-mail to the PC200 via the network I/F unit 108 (step S702), without activating the main processor 101. The mail server 300B receives and stores the E-mail (STinfo).

FIG. 31 shows an example of a content of the status request mail 1600. In this example, a main body of the E-mail contains a description (ORDER: STATUS) indicting the status request. FIG. 32 shows an example of a content of the E-mail containing a description of the status information (STinfo). In this example, the main body of the E-mail contains a description (STATUS: SLEEP MODE) indicating that the printer 100 is in the sleep mode.

Then, the sub processor 109 deletes the E-mail (STinfo) from the mail server 300B (step S507). More specifically, as shown in FIG. 30, the sub processor 109 establishes connection with the mail server 3008 via the network I/F unit 108, and sends a deletion request RQTd to the mail server 300B. In response to the deletion request RQTd, the mail server 3008 deletes the designated status request mail (E-mail (STreq)) (step PS83 in FIG. 30). After the deletion of the status request mail is completed, the mail server 300B returns a response message RES.

The PC 200 accesses the mail server 300B, and acquires the returned E-mail (STinfo) stored in the mail server 300B. The user can recognize the current status of the printer 100 based on the content of the returned E-mail, and can determine whether to issue a print job to the printer 100 based on the current status of the printer 100. Since the printer 100 sends the return E-mail (STinfo) in the sleep mode, the status-response processing can be performed with low power consumption.

Modifications of Embodiments 1 Through 4

The above described embodiments are merely examples, and various modifications can be made. For example, the above described configuration of the printer 100 can be applicable to an apparatus having a printing function such as an MFP (Multifunction Peripheral), a copier, a facsimile machine.

While the preferred embodiments of the present invention have been illustrated in detail, it should be apparent that modifications and improvements may be made to the invention without departing from the spirit and scope of the invention as described in the following claims.

What is claimed is:

1. An image forming apparatus having a normal mode and a power-saving mode, said image forming apparatus comprising:
    a network interface unit for communication with an electronic mail server connected to a communication network;
    a main control unit that controls an entire operation of said image forming apparatus, said main control unit being configured not to operate in said power-saving mode;
    a sub control unit that performs an inquiry to said electronic mail server via said network interface unit in said power-saving mode about whether an electronic mail addressed to said image forming apparatus is stored in said electronic mail server, and an image forming unit that forms an image on a recording medium, wherein, when said sub control unit judges that an electronic mail addressed to said image forming apparatus is stored in said electronic mail server based on a result of said inquiry, said sub control unit activates said main control unit to cause said image forming apparatus to shift from said power-saving mode to said normal mode;

wherein, after said main control unit causes said image forming apparatus to shift from said power-saving mode to said normal mode, said main control unit acquires said electronic mail from said electronic mail server via said network interface unit;

wherein said image forming unit forms an image on said recording medium according to an attachment file attached to said electronic mail acquired by said main control unit;

wherein, when said sub control unit judges that an electronic mail addressed to said image forming apparatus is stored in said electronic mail server based on a result of said inquiry, said sub control unit acquires said electronic mail from said electronic mail server via said network interface unit; and wherein, when said electronic mail contains a description of a status request, said sub control unit returns an electronic mail containing status information indicating a current status of said image forming unit via said network interface unit, without activating said main control unit.

2. The image forming apparatus according to claim 1, further comprising a configuration information storage unit that stores a time interval set by a user operation, wherein said sub control unit performs said inquiry to said electronic mail server at said time interval.

3. The image forming apparatus according to claim 2, wherein said configuration information storage unit further stores information about a power-saving mode transition time set by a user operation, and wherein said main control unit causes said image forming apparatus to shift from said normal mode to said power-saving mode when said power-saving mode transition time is reached.

4. The image forming apparatus according to claim 2, further comprising an operation input unit that accepts said user operation.

5. The image forming apparatus according to claim 1, wherein said main control unit transfers said status information to said sub control unit before said main control unit shifts said image forming apparatus from said normal mode to said power-saving mode.

6. The image forming apparatus according to claim 1, wherein said sub control unit operates with lower power consumption than said main control unit.

7. The image forming apparatus according to claim 1, further comprising a power control unit that restricts power supply to said image forming unit to thereby stop an operation of said image forming unit in said power-saving mode.

8. An image forming apparatus having a normal mode and a power-saving mode, said image forming apparatus comprising:

a network interface unit for communication with an electronic mail server connected to a communication network, said electronic mail server including a server function unit that receives and stores electronic mail via said communication network, and a preliminary checking unit that checks whether an attachment file attached to electronic mail has a format in which an image can be formed on a recording medium, and stores an electronic mail containing a description of print instruction information as a print instruction mail in another electronic mail server when said attachment file has said format;

a main control unit that controls an entire operation of said image forming apparatus, said main control unit being configured not to operate in said power-saving mode;

a sub control unit that performs an inquiry to said electronic mail server via said network interface unit in said power-saving mode about whether an electronic mail addressed to said image forming apparatus is stored in said electronic mail server, and an image forming unit that forms an image on a recording medium, wherein, when said sub control unit judges that an electronic mail addressed to said image forming apparatus is stored in said electronic mail server based on a result of said inquiry, said sub control unit activates said main control unit to cause said image forming apparatus to shift from said power-saving mode to said normal mode;

wherein, after said main control unit causes said image forming apparatus to shift from said power-saving mode to said normal mode, said main control unit acquires said electronic mail from said electronic mail server via said network interface unit;

wherein said image forming unit forms an image on said recording medium according to an attachment file attached to said electronic mail acquired by said main control unit;

wherein said sub control unit performs an inquiry to said another electronic mail server via said network interface unit in said power-saving mode about whether a print instruction mail addressed to said image forming apparatus is stored in said another electronic mail server;

wherein, when said sub control unit judges that a print instruction mail addressed to said image forming apparatus is stored in said another electronic mail server based on a result of said inquiry, said sub control unit activates said main control unit to cause said image forming apparatus to shift from said power-saving mode to said normal mode;

wherein, after said main control unit causes said image forming apparatus to shift from said power-saving mode to said normal mode, said main control unit acquires said electronic mail from said electronic mail server via said network interface unit, and wherein said image forming unit forms an image on said recording medium according to said attachment file attached to said electronic mail acquired by said main control unit.

9. The image forming apparatus according to claim 8, wherein said main control unit deletes every said print instruction mail stored in said another electronic mail server, and acquires said electronic mail from said electronic mail server via said network interface unit, before said main control unit causes said image forming apparatus to shift from said normal mode to said power-saving mode, and wherein said image forming unit forms an image on said recording medium according to said attachment file attached to said electronic mail acquired by said main control unit, before said image forming apparatus shifts from said normal mode to said power-saving mode.

10. The image forming apparatus according to claim 8, wherein said another mail server receives and stores an electronic mail, as a status request mail, containing a description of a status request addressed to said image forming apparatus from a client terminal connected to said communication network, and wherein, when said sub control unit judges that said status request mail is stored in said another electronic mail server based on a result of said inquiry to said another electronic mail server, said sub control unit returns an electronic mail containing a description of status information indicating a current status of said image forming unit.

11. The image forming apparatus according to claim 8, wherein said main control unit communicates with said electronic mail server using an encrypted communication.

12. The image forming apparatus according to claim 8, wherein said sub control unit communicates with said another electronic mail server using a plain text.

13. An image forming system comprising:
said electronic mail server connected to said communication network, and
said image forming apparatus according to claim 1.

14. An image forming system comprising first and second mail servers connected to a communication network, and an image forming apparatus having a normal mode and a power-saving mode and comprising an image forming unit configured to form an image on a recording medium, said first mail server comprising:

a server function unit that receives and stores an electronic mail addressed to said image forming apparatus from a client terminal connected to said communication network, and a preliminary checking unit that checks whether an attachment file attached to said electronic mail stored by said server function unit has a format in which an image can be formed on said recording medium, and stores an electronic mail containing a description of print instruction information as a print instruction mail in said second electronic mail server when said attachment file has said format, said image forming apparatus comprising:

a network interface unit for communication with said first and second electronic mail servers via said communication network;

a main control unit that controls an entire operation of said image forming apparatus, said main control unit being configured not to operate in said power-saving mode;

a power control unit that performs power supply to said main control unit in said normal mode, and restricts power supply to said main control unit to thereby stop said main control unit in said power-saving mode, and a sub control unit that performs an inquiry to said second electronic mail server via said network interface unit in said power-saving mode about whether a print instruction mail addressed to said image forming apparatus is stored in said second electronic mail server, wherein, when said sub control unit judges that a print instruction mail addressed to said image forming apparatus is stored in said second electronic mail server based on a result of said inquiry, said sub control unit activates said main control unit to cause said image forming apparatus to shift from said power-saving mode to said normal mode;

wherein, after said main control unit causes said image forming apparatus to shift from said power-saving mode to said normal mode, said main control unit acquires said electronic mail from said first electronic mail server via said network interface unit, and wherein said image forming unit forms an image on said recording medium according to said attachment file attached to said electronic mail acquired by said main control unit.

15. The image forming system according to claim 14, wherein said main control unit deletes every said print instruction mail stored in said second electronic mail server, and acquires said electronic mail from said first electronic mail server via said network interface unit, before said main control unit shifts said image forming apparatus from said normal mode to said power-saving mode, and wherein said image forming unit forms an image on said recording medium according to said attachment file attached to said electronic mail acquired by said main control unit, before said image forming apparatus shifts from said normal mode to said power-saving mode.

16. The image forming system according to claim 14, wherein said main control unit communicates with said first electronic mail server using an encrypted communication, and wherein said sub control unit communicates with said second electronic mail server using a plain text.

17. The image forming system according to claim 14, wherein said second mail server receives and stores an electronic mail, as a status request mail, containing a description of a status request addressed to said image forming apparatus from a client terminal connected to said communication network, and wherein, when said sub control unit judges that said status request mail is stored in said second electronic mail server based on a result of said inquiry to said second electronic mail server, said sub control unit returns an electronic mail containing a description of status information indicating a current status of said image forming unit.

\* \* \* \* \*